United States Patent
Muthineni et al.

(10) Patent No.: US 12,261,937 B2
(45) Date of Patent: **\*Mar. 25, 2025**

(54) METHOD AND APPARATUS FOR AN ULTRA LOW POWER VLSI IMPLEMENTATION OF THE 128-BIT AES ALGORITHM USING A NOVEL APPROACH TO THE SHIFTROW TRANSFORMATION

(71) Applicant: The Board of Regents of the University of Texas System, Austin, TX (US)

(72) Inventors: Alekhya Muthineni, San Antonio, TX (US); Eugene John, San Antonio, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,260

(22) Filed: Nov. 30, 2023

(65) Prior Publication Data

US 2024/0187212 A1    Jun. 6, 2024

Related U.S. Application Data

(63) Continuation of application No. 16/845,556, filed on Apr. 10, 2020, now Pat. No. 11,838,403.
(Continued)

(51) Int. Cl.
*H04L 9/06*     (2006.01)
*G06F 1/26*     (2006.01)

(52) U.S. Cl.
CPC ............ *H04L 9/0631* (2013.01); *G06F 1/26* (2013.01)

(58) Field of Classification Search
CPC ................. H04L 9/0631; G06F 1/26
See application file for complete search history.

(56) References Cited

U.S. PATENT DOCUMENTS 4,675,842 A * 6/1987 Szenes ............. G09G 5/001
                                              711/207
5,459,483 A * 10/1995 Edwards .......... H04N 25/60
                                              345/98

(Continued)

OTHER PUBLICATIONS

High Secured Low Power Multiplexer-LUT Based AES S-Box Implementation (Year: 2016) (Year: 2016).*
(Continued)

*Primary Examiner* — Shewaye Gelagay
*Assistant Examiner* — Thomas A Carnes
(74) *Attorney, Agent, or Firm* — Smith, Gambrell & Russell, LLP; Gregory J. Kirsch

(57) ABSTRACT

The present techniques may provide improved processing and functionality of performance of the 128-bit AES Algorithm, which may provide improved power consumption. For example, in an embodiment, an encryption and decryption apparatus may comprise memory storing a current state matrix of an encryption or decryption process and a plurality of multiplexers configured to receive from the memory current elements of the state matrix stored in the memory, perform a cyclic shift on the received elements of the state matrix, and transmit the shifted elements to the memory for storage as a new state matrix.

8 Claims, 23 Drawing Sheets

Related U.S. Application Data

(60) Provisional application No. 62/833,258, filed on Apr. 12, 2019.

(56) References Cited

U.S. PATENT DOCUMENTS

| | | | | |
|---|---|---|---|---|
| 5,553,012 | A * | 9/1996 | Buss | G06F 7/556 708/517 |
| 7,106,860 | B1 * | 9/2006 | Yu | H04L 9/0631 380/37 |
| 2003/0072444 | A1 * | 4/2003 | Hu | H04L 9/0631 380/37 |
| 2004/0202317 | A1 * | 10/2004 | Demjanenko | G06F 9/30007 380/28 |
| 2008/0162745 | A1 * | 7/2008 | Tkacik | G06F 13/364 710/33 |
| 2010/0322411 | A1 * | 12/2010 | Lubberhuizen | H04L 9/0631 380/28 |
| 2011/0013769 | A1 * | 1/2011 | Itoh | H04L 9/003 380/28 |
| 2014/0040334 | A1 * | 2/2014 | Burgess | G06F 1/0353 708/235 |
| 2014/0164725 | A1 * | 6/2014 | Jang | G06F 21/575 710/316 |
| 2015/0086007 | A1 * | 3/2015 | Mathew | H04L 9/0631 380/28 |
| 2016/0171249 | A1 * | 6/2016 | Circello | G06F 21/72 713/189 |
| 2017/0373836 | A1 * | 12/2017 | Rarick | H04L 9/0861 |
| 2019/0179618 | A1 * | 6/2019 | Noor | H04L 9/0637 |

OTHER PUBLICATIONS

FPGA and ASIC Implementations of AES (Year: 2014).*
Design and Implementation of Low-area and Low-power AES Encryption Hardware Core (Year: 2006).*
Efficient Byte Permutation Realizations for Compact AES Implementations (Year: 2005).*
Architectures and VLSI Implementations of the AES-Proposal Rijndael (Year: 2002).*
Wikipedia Clock Gating (Year: 2015).*

* cited by examiner

Fig. 5

|   | \multicolumn{16}{c}{y} |
|---|---|---|---|---|---|---|---|---|---|---|---|---|---|---|---|---|
|   | 0 | 1 | 2 | 3 | 4 | 5 | 6 | 7 | 8 | 9 | a | b | c | d | e | f |
| 0 | 63 | 7c | 77 | 7b | f2 | 6b | 6f | c5 | 30 | 01 | 67 | 2b | fe | d7 | ab | 76 |
| 1 | ca | 82 | c9 | 7d | fa | 59 | 47 | f0 | ad | d4 | a2 | af | 9c | a4 | 72 | c0 |
| 2 | b7 | fd | 93 | 26 | 36 | 3f | f7 | cc | 34 | a5 | e5 | f1 | 71 | d8 | 31 | 15 |
| 3 | 04 | c7 | 23 | c3 | 18 | 96 | 05 | 9a | 07 | 12 | 80 | e2 | eb | 27 | b2 | 75 |
| 4 | 09 | 83 | 2c | 1a | 1b | 6e | 5a | a0 | 52 | 3b | d6 | b3 | 29 | e3 | 2f | 84 |
| 5 | 53 | d1 | 00 | ed | 20 | fc | b1 | 5b | 6a | cb | be | 39 | 4a | 4c | 58 | cf |
| 6 | d0 | ef | aa | fb | 43 | 4d | 33 | 85 | 45 | f9 | 02 | 7f | 50 | 3c | 9f | a8 |
| 7 | 51 | a3 | 40 | 8f | 92 | 9d | 38 | f5 | bc | b6 | da | 21 | 10 | ff | f3 | d2 |
| 8 | cd | 0c | 13 | ec | 5f | 97 | 44 | 17 | c4 | a7 | 7e | 3d | 64 | 5d | 19 | 73 |
| 9 | 60 | 81 | 4f | dc | 22 | 2a | 90 | 88 | 46 | ee | b8 | 14 | de | 5e | 0b | db |
| a | e0 | 32 | 3a | 0a | 49 | 06 | 24 | 5c | c2 | d3 | ac | 62 | 91 | 95 | e4 | 79 |
| b | e7 | c8 | 37 | 6d | 8d | d5 | 4e | a9 | 6c | 56 | f4 | ea | 65 | 7a | ae | 08 |
| c | ba | 78 | 25 | 2e | 1c | a6 | b4 | c6 | e8 | dd | 74 | 1f | 4b | bd | 8b | 8a |
| d | 70 | 3e | b5 | 66 | 48 | 03 | f6 | 0e | 61 | 35 | 57 | b9 | 86 | c1 | 1d | 9e |
| e | e1 | f8 | 98 | 11 | 69 | d9 | 8e | 94 | 9b | 1e | 87 | e9 | ce | 55 | 28 | df |
| f | 8c | a1 | 89 | 0d | bf | e6 | 42 | 68 | 41 | 99 | 2d | 0f | b0 | 54 | bb | 16 |

(x labels rows)

Fig. 8

| General Circulant Matrix | | | | | AES Circulant Matrix | | | |
|---|---|---|---|---|---|---|---|---|
| C0 | C3 | C2 | C1 | | 2 | 3 | 1 | 1 |
| C1 | C0 | C3 | C2 | | 1 | 2 | 3 | 1 |
| C2 | C1 | C0 | C3 | | 2 | 3 | 1 | 1 |
| C3 | C2 | C1 | C0 | | 3 | 1 | 1 | 2 |

Fig. 9

$$\begin{bmatrix} b_0 \\ b_1 \\ b_2 \\ b_3 \end{bmatrix} = \begin{bmatrix} 02 & 03 & 01 & 01 \\ 01 & 02 & 03 & 01 \\ 01 & 01 & 02 & 03 \\ 03 & 01 & 01 & 02 \end{bmatrix} \begin{bmatrix} a_0 \\ a_1 \\ a_2 \\ a_3 \end{bmatrix}$$

Fig. 10

| $S_0$ | $S_4$ | $S_8$ | $S_{12}$ |
|---|---|---|---|
| $S_1$ | $S_5$ | $S_9$ | $S_{13}$ |
| $S_2$ | $S_6$ | $S_{10}$ | $S_{14}$ |
| $S_3$ | $S_7$ | $S_{11}$ | $S_{15}$ |

⊗

| $W_0$ | $W_4$ | $W_8$ | $W_{12}$ |
|---|---|---|---|
| $W_1$ | $W_5$ | $W_9$ | $W_{13}$ |
| $W_2$ | $W_6$ | $W_{10}$ | $W_{14}$ |
| $W_3$ | $W_7$ | $W_{11}$ | $W_{15}$ |

=

| $S'_0$ | $S'_4$ | $S'_8$ | $S'_{12}$ |
|---|---|---|---|
| $S'_1$ | $S'_5$ | $S'_9$ | $S'_{13}$ |
| $S'_2$ | $S'_6$ | $S'_{10}$ | $S'_{14}$ |
| $S'_3$ | $S'_7$ | $S'_{11}$ | $S'_{15}$ |

Initial(Key+Cipher)   Expanded Key   First Round cipher

|   | y |   |   |   |   |   |   |   |   |   |   |   |   |   |   |   |
|---|---|---|---|---|---|---|---|---|---|---|---|---|---|---|---|---|
|   |   | 0 | 1 | 2 | 3 | 4 | 5 | 6 | 7 | 8 | 9 | a | b | c | d | e | f |
| x | 0 | 52 | 09 | 6a | d5 | 30 | 36 | a5 | 38 | bf | 40 | a3 | 9e | 81 | f3 | d7 | fb |
|   | 1 | 7c | e3 | 39 | 82 | 9b | 2f | ff | 87 | 34 | 8e | 43 | 44 | c4 | de | e9 | cb |
|   | 2 | 54 | 7b | 94 | 32 | a6 | c2 | 23 | 3d | ee | 4c | 95 | 0b | 42 | fa | c3 | 4e |
|   | 3 | 08 | 2e | a1 | 66 | 28 | d9 | 24 | b2 | 76 | 5b | a2 | 49 | 6d | 8b | d1 | 25 |
|   | 4 | 72 | f8 | f6 | 64 | 86 | 68 | 98 | 16 | d4 | a4 | 5c | cc | 5d | 65 | b6 | 92 |
|   | 5 | 6c | 70 | 48 | 50 | fd | ed | b9 | da | 5e | 15 | 46 | 57 | a7 | 8d | 9d | 84 |
|   | 6 | 90 | d8 | ab | 00 | 8c | bc | d3 | 0a | f7 | e4 | 58 | 05 | b8 | b3 | 45 | 06 |
|   | 7 | d0 | 2c | 1e | 8f | ca | 3f | 0f | 02 | c1 | af | bd | 03 | 01 | 13 | 8a | 6b |
|   | 8 | 3a | 91 | 11 | 41 | 4f | 67 | dc | ea | 97 | f2 | cf | ce | f0 | b4 | e6 | 73 |
|   | 9 | 96 | ac | 74 | 22 | e7 | ad | 35 | 85 | e2 | f9 | 37 | e8 | 1c | 75 | df | 6e |
|   | a | 47 | f1 | 1a | 71 | 1d | 29 | c5 | 89 | 6f | b7 | 62 | 0e | aa | 18 | be | 1b |
|   | b | fc | 56 | 3e | 4b | c6 | d2 | 79 | 20 | 9a | db | c0 | fe | 78 | cd | 5a | f4 |
|   | c | 1f | dd | a8 | 33 | 88 | 07 | c7 | 31 | b1 | 12 | 10 | 59 | 27 | 80 | ec | 5f |
|   | d | 60 | 51 | 7f | a9 | 19 | b5 | 4a | 0d | 2d | e5 | 7a | 9f | 93 | c9 | 9c | ef |
|   | e | a0 | e0 | 3b | 4d | ae | 2a | f5 | b0 | c8 | eb | bb | 3c | 83 | 53 | 99 | 61 |
|   | f | 17 | 2b | 04 | 7e | ba | 77 | d6 | 26 | e1 | 69 | 14 | 63 | 55 | 21 | 0c | 7d |

Fig. 14

| 0E | 0B | 0D | 09 |
|----|----|----|----|
| 09 | 0E | 0B | 0D |
| 0D | 09 | 0E | 0B |
| 0B | 0D | 09 | 0E |

2200

2300

2400

2500

2600

2700

METHOD AND APPARATUS FOR AN ULTRA LOW POWER VLSI IMPLEMENTATION OF THE 128-BIT AES ALGORITHM USING A NOVEL APPROACH TO THE SHIFTROW TRANSFORMATION

CROSS-REFERENCE TO RELATED APPLICATIONS

This application is a continuation of U.S. patent application Ser. No. 16/845,556, filed Apr. 10, 2020, now U.S. Pat. No. 11,838,403, which claims the benefit of priority to U.S. Provisional Patent Application No. 62/833,258 filed on Apr. 12, 2019, each of which is incorporated by reference in its entirety herein.

BACKGROUND

The present invention relates to techniques that provide improved processing and functionality of performance of the 128-bit AES Algorithm.

With the fast growing digital world, security of data has become a critical issue. The security of personal data has become the most important aspect of modern technologies and to tackle this challenge, an age old technique known as cryptography is widely applied. A tremendous amount of work has been done in this realm with great progress over the years. Various cryptographic algorithms such as DES, 3DES, Blowfish, Twofish and AES have been developed over the years to address the security of data. Presently, the most widely used cryptographic algorithm is the Advanced Encryption Standard also called as the AES Algorithm in short. Since the inception of AES, many advancements have been achieved and much work has been done to get better values for the parameters under measurement. However, for most present-day applications, such as portable devices and Internet of Things (IoTs) in which battery power is limited, power efficiency and throughput are of utmost importance. Hence, ultra-low power implementation of the AES algorithm has become important for a range of devices. This thesis focuses on optimizing the power consumption of the 128-bit AES Algorithm.

Various low power VLSI techniques exist and are used widely for the purpose of power optimization of the design and implementation of digital systems. However, that alone is not enough and is not the best way to achieve reduced power consumption.

A need arises for techniques that provide improved processing and functionality of performance of the 128-bit AES Algorithm, which provides improved power consumption.

SUMMARY

The present techniques may provide improved processing and functionality of performance of the 128-bit AES Algorithm, which may provide improved power consumption. Rather than just applying a low power technique on an existing design, the present techniques may utilize an alternate computational algorithm and then uses low power techniques on the modified algorithm. This is done by analyzing various layers of the AES and identifying various methodologies and power optimization techniques that have been implemented. With this information, a modified algorithm is proposed by substituting or eliminating certain elements from the layers of the algorithm. Through this, embodiments of the architecture may not only achieve power optimization, but also an area efficient model by eliminating unnecessary circuitry from the design.

In an embodiment, an encryption and decryption apparatus may comprise memory storing a current state matrix of an encryption or decryption process and a plurality of multiplexers configured to receive from the memory current elements of the state matrix stored in the memory, perform a cyclic shift on the received elements of the state matrix, and transmit the shifted elements to the memory for storage as a new state matrix.

In embodiments, the encryption or decryption process may be an Advanced Encryption Standard encryption or decryption process. The Advanced Encryption Standard encryption or decryption process may be a 128-bit process. The cyclic shift may be the Advanced Encryption Standard ShiftRow operation. The encryption and decryption apparatus comprising the plurality of multiplexers to perform the Advanced Encryption Standard ShiftRow operation may consume less power than an encryption and decryption apparatus comprising registers to perform the Advanced Encryption Standard ShiftRow operation. The apparatus may further comprise circuitry configured to perform clock gating.

In an embodiment, the method of encryption and decryption may comprise storing, in a memory, a current state matrix of an encryption or decryption process, receiving, through plurality of multiplexers from the memory, current elements of the state matrix stored in the memory, performing, through plurality of multiplexers, a cyclic shift on the received elements of the state matrix, and transmitting, from the plurality of multiplexers to the memory, the shifted elements for storage as a new state matrix.

BRIEF DESCRIPTION OF THE DRAWINGS

The details of the present invention, both as to its structure and operation, can best be understood by referring to the accompanying drawings, in which like reference numbers and designations refer to like elements.

FIG. 5 is an exemplary illustration of a Look Up table involved in the AES process.

FIG. 8 is an exemplary illustration of the circulant matrix used in the AES process.

FIG. 9 is an exemplary illustration of matrix multiplication performed in the AES process.

FIG. 10 is an exemplary illustration of the round key addition step performed in the AES process.

FIG. 14 is an exemplary illustration of the inverse circulant matrix used in the AES process.

DETAILED DESCRIPTION

The present techniques may provide improved processing and functionality, which provides improved power consumption. Rather than just applying a low power technique on an existing design, the present techniques may utilize an alternate computational algorithm and then uses low power techniques on the modified algorithm. This is done by analyzing various layers of the AES and identifying various methodologies and power optimization techniques that have been implemented. With this information, a modified algorithm is proposed by substituting or eliminating certain elements from the layers of the algorithm. Through this, embodiments of the architecture may not only achieve power optimization, but also an area efficient model by eliminating unnecessary circuitry from the design.

The interest in hardware encryption is developing at a quick pace as the advancement of technology and digital electronics has developed to enable society to remain connected in everyday life. These modern-day devices and applications enable us to shop on-line, effectively perform bank exchanges, browse hundreds of websites, and even surf the web from mobile hotspots. But on the down side, it makes our personal information vulnerable. It is said that any kind of information, once uploaded on the web, can never be deleted or destroyed.

In due course of time, over the years the consumer market has demonstrated a greater interest for the protection of data because of the harming impacts it could have on an organization's benefits and reputation. For example, cable companies may encrypt each of the channels they transmit; expecting clients to have a unique set-top box to decrypt the received signals. This was done to stop unauthorized viewing of these channels by non-subscribers. In the gaming industry, encryption may be used to make sure that players can only play authorized games only on their console. The various hacks of credit card and other data are good examples of why security of financial data is very important. For example, unencrypted credit and debit card information of millions of customers may be hacked. Hence the need for efficient security and encryption of sensitive data has become important in today's society.

Cryptography is a method used to securitize a data/ message called a cipher, which can only be decoded by an intended recipient. Every ciphering technique is based on some kind of decode key system. Classical crypto-graphical algorithms are those that were invented during the pre-computer era up until around the 1950's. Earlier, cryptography was designed to allow manual encryption and decryption. Though most people claim they are not aware of cryptography, they are often familiar with the concept of ciphers.

Figure 1:
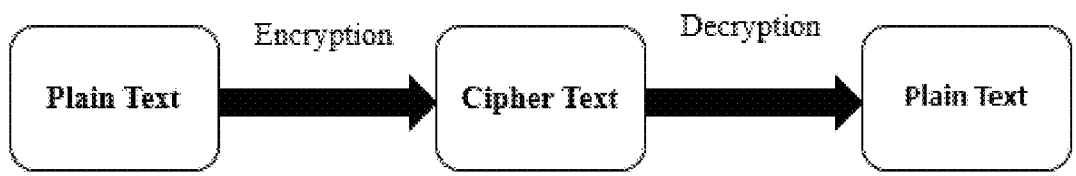
FIG. 1 is an exemplary illustration of the concepts of encryption and decryption.

Information that can be comprehended with no extra measures is called 'plaintext' or 'cleartext'. The technique of disguising plaintext such as to hide its actual data is called encryption. The product obtained from encrypting plaintext is incomprehensible gibberish which is called 'ciphertext'. The method of extracting the original plaintext from the encrypted version is called decryption. FIG. 1 illustrates the concepts of encryption and decryption.

Physical implementation of the algorithm is additionally an essential factor as it impacts security, speed, area, and power of devices. For frameworks managing national security and protection of classified information, designers may tradeoff area and power to emphasize speed and security. On the other hand, the need for high speed and high throughput can be of more importance for network applications that require transmission of secured data. Portable electronic devices such as RFID cards, cellphones and activity trackers may emphasize on power and area efficiency because of a limited battery source and a small frame factor.

Advanced Encryption Standard (AES), also known as Rijndael, is the most widely used encryption standard for security of data transmissions. It was first published by the National Institute of Standards and Technology (NIST) in January 1997. Over nine months, a total of fifteen countries competed to propose a design which was evaluated based on security, performance and a variety of other settings and limitations in different environments and finally the Rijndael cipher was selected. Rijndael is an iterated block cipher which has variable key lengths, 128, 192 and 256 bits, and a block length of 128 bits. AES uses a symmetric key algorithm which means that ciphering and deciphering uses the same key which makes it necessary for both people/ parties involved in the data transmission to have the same key. AES is a design based on a design principle known as substitution-permutation network and is fast in both hardware and software.

Embodiments of the present systems and methods may utilize an improved algorithm based on the different layers of the AES standard thus achieving a power optimized circuit with minimal delay tradeoff. This is achieved by breaking down the individual steps involved in the realization of the algorithm and introducing efficient alternate architecture for the existing steps. Embodiments may be clock gated to achieve a pipelined design in which the previous stages of the pipeline can be shut down once completed, thus achieving power optimization.

In order to optimize the design in terms of power, a careful analysis of the individual layers of the AES was necessary to analyze for the scope of optimization in each layer. The same was done in this work and a modification was done to the original algorithm to achieve power optimization. In embodiments, a new method for the ShiftRow transformation step may be utilized. In embodiments, the ShiftRow transformation step may be implemented using multiplexers to perform the cyclic shift on the elements of the state matrix as opposed to using registers as in the conventional designs. This allows the elimination of one whole step in each round of the algorithm which reduces the total circuitry required significantly. Thus the power consumption may be reduced by the embodiments. Furthermore, clock gating may be performed on the design to get the most power optimized version of the algorithm.

MODES OF AES ENCRYPTION. The AES encryption algorithm is a block cipher. Practical applications of AES encryption usually work with data pieces larger than the simple 128 bits that the algorithm accepts as an input. Because of this, different modes of operation are used to allow large amounts of data to be encrypted under the same key. For a better understanding of these modes, Forward Cipher will be the name used for the encryption process and Inverse Cipher will be the name used for the decryption process as described previously in the chapter. An initialization vector is used in all other modes of operation to produce unique ciphertext even when the same data is encrypted multiple times with the same key. The initialization vector does not need to be kept secret, however, it is important not to reuse the same vector under the same key. The modes of operation are classified and operated as follows.

Electronic Code Book (ECB) Mode
Cipher Block Chaining (CBC) Mode
Cipher Feedback (CFB) Mode
Output Feedback (OFB) Mode
Counter (CTR) Mode ECB MODE. An Electronic Code Book or ECB mode is the simplest way to encrypt a large message. In this mode, the message is broken up into 128 bit blocks and the Forward Cipher is applied to each block. To decrypt, the ciphertext is broken up into 128 bit blocks and the Inverse Cipher is performed. One problem with this mode of operation is that if a message contains a large number of identical data blocks, they will be mapped to the same cipher text blocks. This is a flaw when encryption of large messages has to be done using the same key.

CBC MODE. In cipher block chaining or CBC mode, the initial plaintext block is XORed with an initialization vector, then the Forward Cipher is applied. Each of the subsequent plain text blocks are XORed with the previous cipher text and then put into the Forward Cipher for encryption. For decryption, the cipher text is run through the Inverse Cipher and then XORed with the same initialization vector that was used for encryption. Each subsequent ciphertext is put through the Inverse Cipher and then XORed with the previous ciphertext. With this mode of operation, encryption requires ciphertext from the block before and that is not available until after the Forward Cipher is applied, therefore, it cannot be parallelized. The decryption process, however, can be parallelized because it uses the previous block's ciphertext which is available at the start of decryption. The message must be a multiple of 128 bits or it must be padded to be a multiple of 128 bits. Another drawback with this mode is that a one bit change in the plaintext affects all subsequent ciphertexts during encryption. A one bit change in the ciphertext causes a complete corruption of that current blocks plaintext and inverts that same bit in the following blocks of plaintext.

CFB MODE. For Cipher Feedback or CFB mode the initialization vector is encrypted at the start for both encryption and decryption and the result is XORed with either the plaintext block or the ciphertext block. For encryption, each of the subsequent blocks use the previous ciphertext as the input to the Forward Cipher and then the plaintext is XORed with the result. For decryption, each subsequent block uses the previous ciphertext as the input to the Forward Cipher and the result is XORed with the current ciphertext to produce the plaintext. One advantage of using CFB mode over the previously mentioned CBC mode is that both encryption and decryption use the Forward Cipher logic. Another advantage is that the message does not need to be padded to a multiple of 128 bits. Similar to CBC, the CFB mode of encryption cannot be parallelized because it uses the previous block's ciphertext, which is not available until after the Forward Cipher and XOR operations are performed. However, the decryption process can be parallelized, because it uses the previous block's ciphertext as the input to the Inverse Cipher, which is available at the start of decryption. Just like the CBC mode, a one bit change in the ciphertext causes an inverted bit in the current blocks plaintext and a complete corruption in the following blocks of plaintext.

OFB MODE. For the Output Feedback or OFB mode, the initialization vector is encrypted at the start and the result is XORed with either the plaintext block or the ciphertext block. For encryption, each of the subsequent blocks use the previous Forward Cipher blocks as the input to the current Forward Cipher. The current Forward Cipher result is XORed with the plaintext to generate the ciphertext. For decryption, each subsequent block uses the previous Forward Cipher blocks as the input to the current Forward cipher. The current Forward Cipher result is XORed with the ciphertext to produce the plaintext. Similar to CFB, an advantage for using OFB mode is that both the encryption and decryption only use the Forward Cipher logic. Neither the encryption nor the decryption process can be parallelized, because the next input relies on the previous output from the Forward Cipher. However, since the initialization vector, not the data, is fed into the forward cipher, it is possible to perform the forward cipher calculation on the initialization vector up front and then parallelize the XOR calculation with the data. The general rule of using a unique initialization vector with each message under the same key applies. Flipping a bit in the ciphertext produces the same flipped bit in the plaintext. This does not need to be padded to a multiple of 128 bits.

CTR MODE. The Counter or CTR mode of operation uses a counting vector for encryption and decryption as the input to the Forward Cipher instead of an initialization vector. The counting vector must not repeat for any blocks encrypted under the same key and can consist of a nonce concatenated with a count value or simply just a count value. For encryption, the result from the Forward Cipher is XORed with the plaintext, whereas, for decryption the result is XORed with the ciphertext. Both encryption and decryption use only the Forward Cipher and the message does not need to be a multiple of 128 bits, just like CFB and OFB.

Since this mode does not rely on calculations of the previous block of data for encryption or decryption both can be parallelized. Flipping a bit in the ciphertext produces the same flipped bit in the plaintext and vice versa. It is a common misconception that counting mode is susceptible to differential cryptanalysis due to the fact that counting vectors for successive blocks only differ by a small amount. However, if conclusions can be made about the result of the cipher because of the knowledge of the input, this would be an inherent flaw with the Forward Cipher and not a result of the Counter Mode. Embodiments of the present systems and method are presented herein utilizing the counting mode as it is just as robust as the others modes while only needing the Forward Cipher logic and also has the ability to be pipelined. However, it is to be noted that the present techniques may also be advantageously applied to the other modes as well.

POWER DISSIPATION. The power dissipation in digital systems has three main components i.e. switching power, short-circuit power and static power as given in Equation 1. The first two terms of the Equation 1 fall in the category of dynamic power dissipation which is the main component of power consumption. The charging and discharging of a capacitor dissipates switching power. The dynamic power dissipation is described in the Equation 2.

$$P_{avg} = P_{switching} + P_{short\ circuit} + P_{leakage} \qquad 3.1$$

$$P_{dyn} = C_L V_{dd}^2 \alpha F \qquad 3.2$$

where $C_L$ is the load capacitance, which is a function of the fan-out, wire length and transistor size. $V_{dd}$ is the supply voltage, $\alpha$ is the activity factor and f is the clock frequency.

From Equation 3.2, it can be interpreted that there are three degrees of freedom in VLSI design, i.e. Voltage, Physical Capacitance and Data activity. Power optimization entails an attempt to reduce at least one of these factors.

Switching Activity: The switching capacity has two components i.e. Folk which determines average periodicity of arrival data and E (sw) which helps in determining the number of transitions generated in each arrival. E (sw) can be reduced by selecting proper architecture for optimization which can be done by choosing appropriate logic topology and logic level optimization techniques which in turn results in low power. Embodiments of the present systems and methods may provide reduction of power dissipation based on a novel circuit architecture and design.

THE AES ALGORITHM. The AES Proposal has well documented the design, specifications, and function of the Rijndael block cipher. The AES is an iterated symmetric block cipher, which means that it works by repeating the same defined steps multiple times and operates on a fixed number of bytes. Most encryption algorithms including AES are reversible. This means that almost the same steps are performed to both encrypt and decrypt the plaintext and ciphertext respectively, the only difference being that for decryption the steps are performed in reverse order. The AES algorithm operates on bytes, which makes it simpler to implement.

Figure 2:
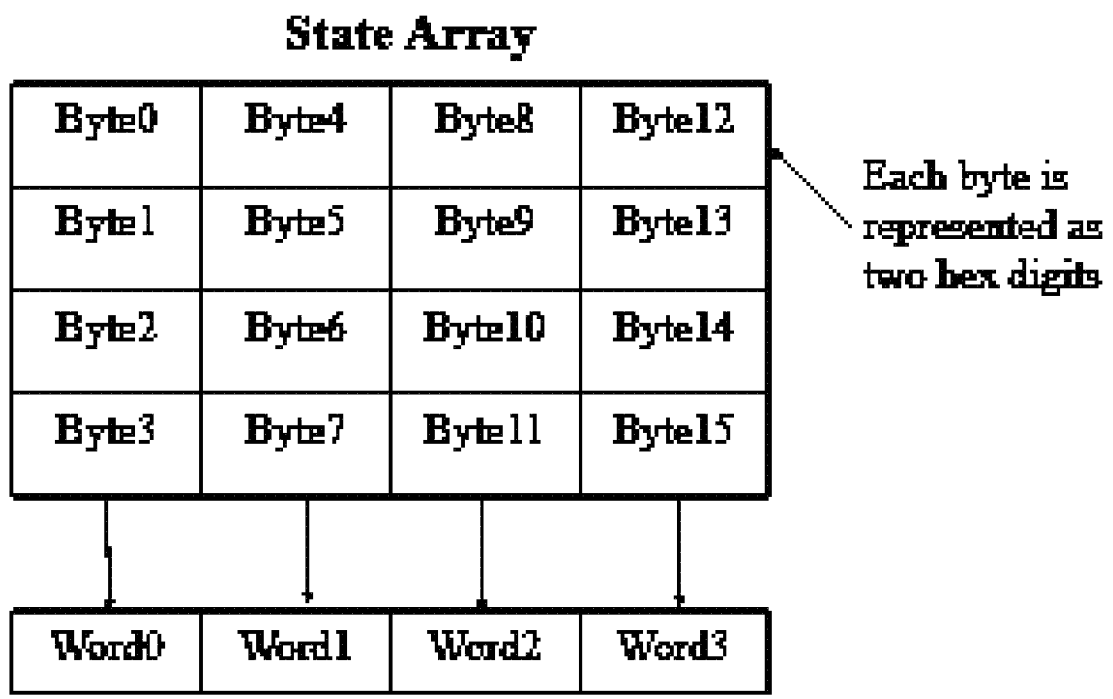
FIG. 2 is an exemplary illustration of a state matrix or state array.

AES ALGORITHM OVERVIEW. The AES algorithm is structured to perform a series of four steps, SubBytes, ShiftRows, MixCols, AddRoundKey, each of which mathematically transform an input data block. Although it was proposed by Rijndael that the input data block sizes could be 128 bit, 192 bit or 256 bit, the AES standard defines a fixed input data block size of 128 bits. The 128 bit input data block is conceptually arranged in a 4×4 matrix of bytes with each column of bytes representing a word. This is often referred to as a state matrix or state array and is shown in FIG. 2.

Each of the data bytes of the state array represent elements in the GF (28) finite field. The byte, consisting of 8 bits, is represented as a polynomial in this finite field as:

$$b_7 x^7 + b_6 x^6 + b_5 x^5 + b_4 x^4 + b_3 x^3 + b_2 x^2 + b_1 x + b_0 \qquad 4.1$$

where the coefficients $b_7$, $b_6$, $b_5$, $b_4$, $b_3$, $b_2$, $b_1$, and $b_0$ represent each bit that can take on a value of 0 or 1. For example, 53 is represented by the polynomial $x^6 + x^4 + x + 1$. The series of steps is usually referred to as a round and is iterated a specific number of times depending on the key length. For simplicity, the AES algorithm with a key length of 128-bits is used as an example herein. However, embodiments of the present systems and methods are applicable to other key lengths as well.

The series of steps is usually referred to as a round and is iterated a specific number of times depending on the key length. There are 3 key lengths available. A table of the number of rounds associated with key lengths is shown in Table 1

TABLE 1

Number of iterations for various key lengths

| Key Length | Number of rounds |
|---|---|
| AES-128 | 10 |
| AES-192 | 12 |
| AES-256 | 14 |

Figure 3:
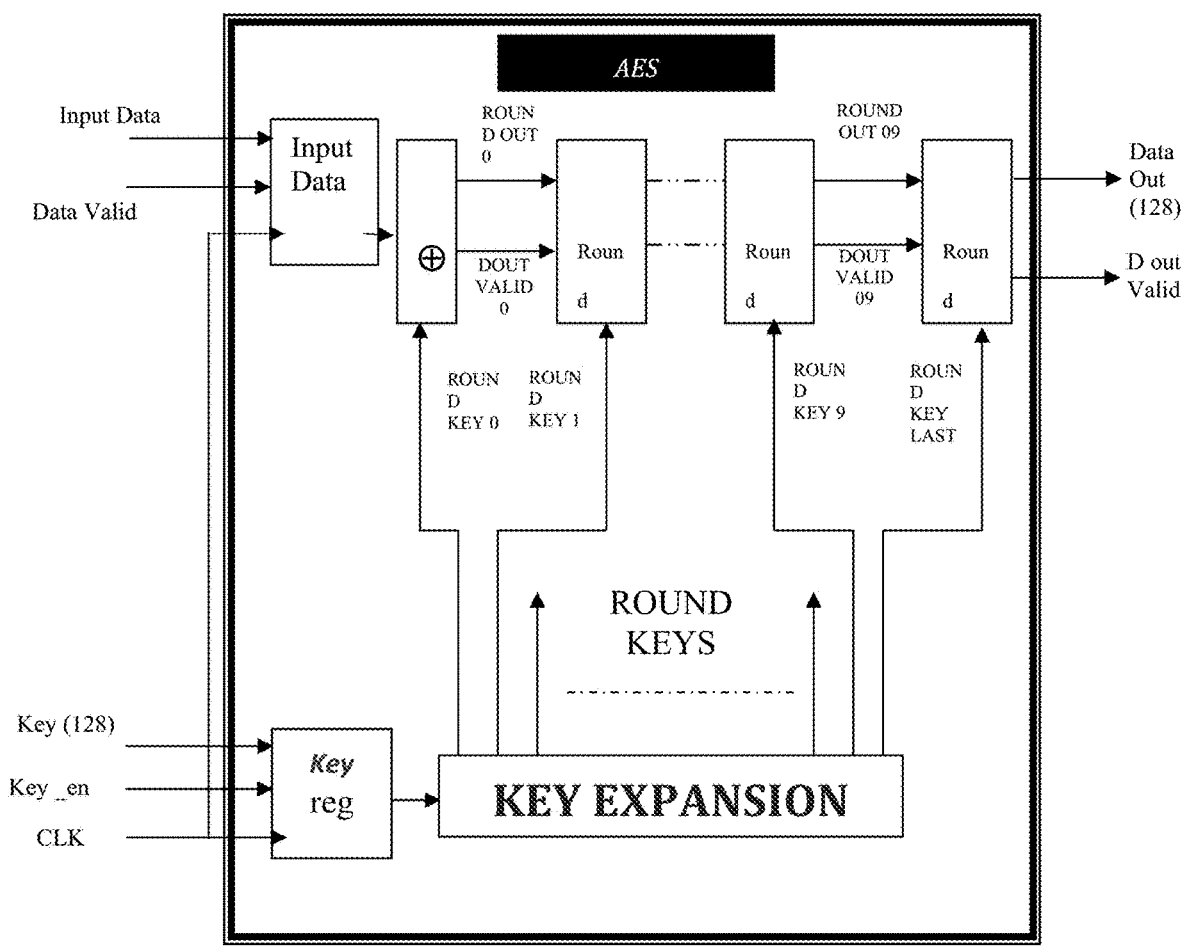
FIG. 3 is an exemplary illustration of the top-level blocks involved in the AES process.

Embodiments of the present systems and methods may utilize the AES algorithm with a key length of, for example, 128-bits. This key length may be represented by Nk=4, which reflects the number of 32-bit words (number of columns) in the Cipher Key. The input block and the output block may also be 128 bits wide. This is represented may be Nb=4, which reflects the number of 32-bit words (number of columns) in the State. The number of rounds to be performed during the execution of the algorithm is dependent on the key size. The number of rounds may be represented by Nr, where Nr=10. Since the key length decides the number of rounds to be performed, the importance of security compared to the combined impact of area, speed, and power is often analyzed prior to choosing a key length. FIG. 3 shows the top-level blocks involved in the algorithm.

As per the standard, 10 rounds for 128 bits key length may be carried out in which the last round may be performed separately. For both encryption and decryption, each round function may be composed of four different byte-oriented transformations which are:

Byte substitution using a substitution table (S-box). (SubBytes)

Shifting rows of the state array by different offsets depending on row number. (ShiftRows)

Mixing the column data of the state array by performing multiplication with a pre-fixed value. (MixColumns)

Adding a round key to the current state in each round. (AddRoundKey)

All of these operations may be carried out in each iteration of the AES algorithm. Based on the key provided, new set of keys will be generated for each round using the key expansion block and will be fed to each round as input. Embodiments of the present systems and methods may provide a novel architecture for performing the byte substitution and row shifting transformations.

KEY EXPANSION. Prior to encryption or decryption, the key has to be expanded. The expanded key is used in the Add Round Key Transformation step. Each time this function is called, a different part of the expanded key is XORed with the current state matrix at that time. For this to work the expanded key must be large enough so that it can provide a key for each time the Add Round Key function is performed. The Add Round Key step is used in each round as well as an extra time at the beginning of the algorithm.

This algorithm generates one key each for every round of the AES, the number of keys generated is directly equal to the number of rounds of AES. The generated keys are known as expanded keys. The expanded key of the current round 'R' is a function $(R-1)$ $n^{th}$ round's key. The original AES proposal represents the expanded key as an array of length equal to the block length multiplied by the number of rounds plus 1 (e.g., for a block length of 128 bits and 10 rounds, 1408 RoundKey bits are needed).

Considering the first four words of the cipher key to be $[W_0, W_1, W_2, W_3]$, then the algorithm subsequently expands a 44-word key schedule that can be labeled $W_0, W_1, W_2$ and so till $W_{43}$. The first four words of the key are used as is, and the rest are expanded with respect to the block length. Furthermore, every $(W_{x+4})^{th}$ word is taken as a function of $W_x \otimes F(W_{x+3})$, and the following $(W_{x+5})$ will be a sum of $(W_{x+5}) \otimes (W_{x+4})$.

The function $F(W_{x+n})$ executes the following consecutive functions:
  Rot Word (4 bytes): This function performs a circular shift on the row where each 4-byte word is cyclically shifted to the left. For example, a sequence 1, 2, 3, 4 gives the result as 2, 3, 4, 1 after the rotation.
  Sub Word (4 bytes): The key expansion unit uses the same S-Box as used in the main algorithm body. This step applies the S-Box value as described in the sub bytes function to each of the 4 bytes in the argument.
  Rcon and XOR: This is basically an abbreviation for 'Round Constant'. It has pre-fixed values for each round of the key expansion. The result of the Sub Word is XORed with the Rcon values given in Table 2 below with respect to the corresponding round number.

TABLE 2

Rcon values corresponding to round number

| Round Number | Rcon | Value |
|---|---|---|
| 1 | Rcon(1) | 01000000 |
| 2 | Rcon(2) | 02000000 |
| 3 | Rcon(3) | 04000000 |
| 4 | Rcon(4) | 08000000 |
| 5 | Rcon(5) | 10000000 |
| 6 | Rcon(6) | 20000000 |
| 7 | Rcon(7) | 40000000 |
| 8 | Rcon(8) | 80000000 |
| 9 | Rcon(9) | 1B000000 |
| 10 | Rcon(10) | 36000000 |

This procedure is carried out in each round of expansion until keys for all rounds of the main algorithm are obtained. Also, a point to be noted is that this layer can be executed with the RoundKey addition during encryption, but it is a necessity to generate all the keys before decryption starts. Therefore to avoid confusion and decrease the circuit complexity, the key expansion layer is completed before the encryption/decryption round transform begins. The Rcon values are the same for both encryption and decryption.

Figure 4:
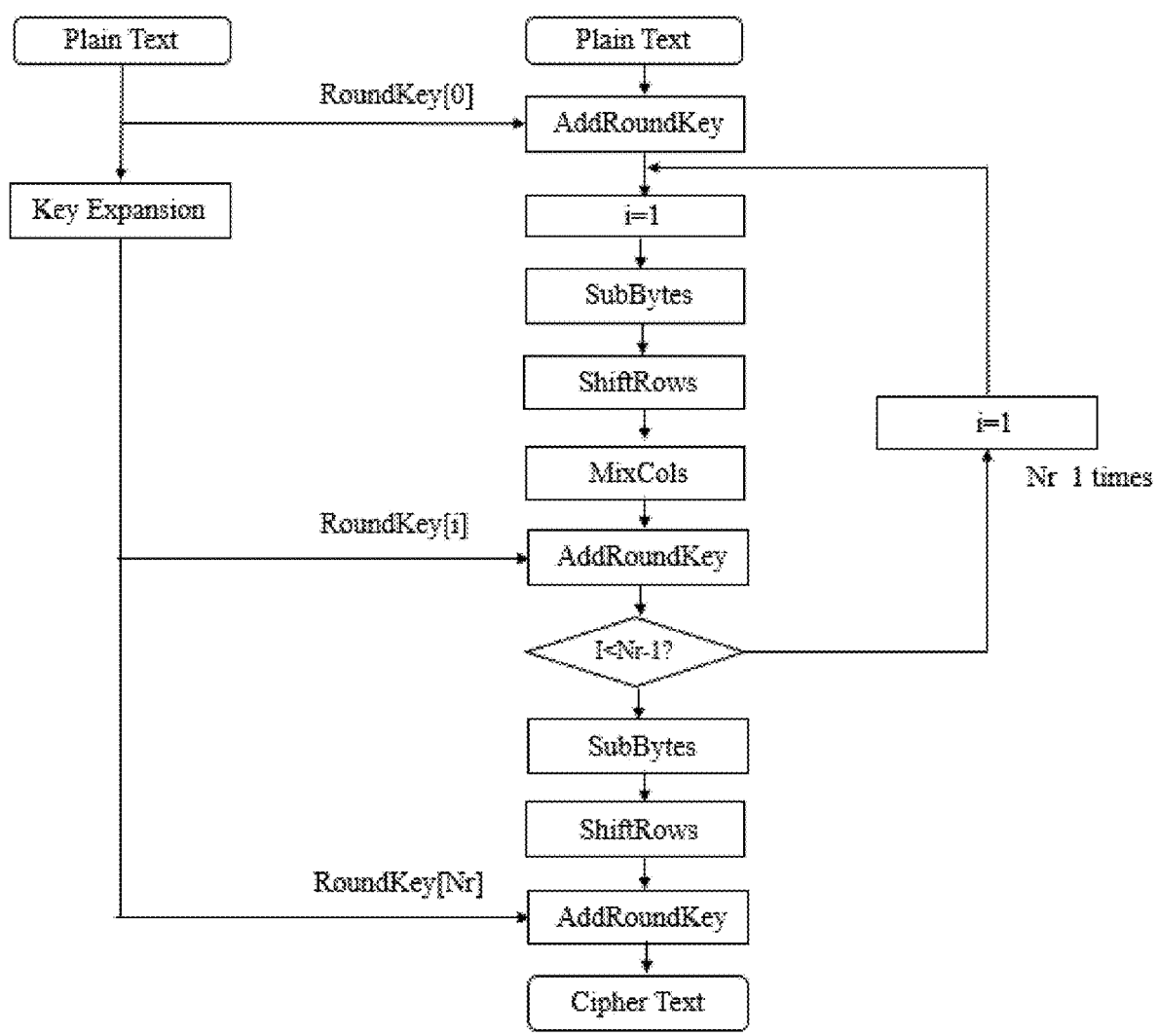
FIG. 4 is an exemplary flow diagram of the steps involved in the AES encryption process.

ENCRYPTION. At the start of the encryption process, the input data and input key are copied to the state array using the conventions. XOR operation is performed between each byte of the input data with the corresponding byte of the input key and the output is given as input to the first round. After the initial round key addition, the state array is transformed by implementing round functions 10 times (for a 128 bit key) with the final round being slightly different from the first 9 rounds. The final state after 10 iterations of this process is then copied to the output. The individual transformations that are carried out in each round are listed and detailed below:
  SubBytes
  ShiftRows
  MixColumns
  AddRoundKey Table 3 specifies the operations performed at each round and the order in which each operation is carried out. Also, FIG. 4 shows a flow diagram of the steps involved in the encryption process. All the rounds are identical except the last one in which the MixColumns transformation is eliminated. Thus, the encrypted data will be achieved at the end of the final round.

TABLE 3

Operations performed in each round

| Round | Function |
|---|---|
| — | Add Round Key (State) |
| 0 | Add Round Key(Mix Colum(Shift Row(Byte Sub(State)))) |
| 1 | Add Round Key(Mix Colum(Shift Row(Byte Sub(State)))) |
| 2 | Add Round Key(Mix Colum(Shift Row(Byte Sub(State)))) |
| 3 | Add Round Key(Mix Colum(Shift Row(Byte Sub(State)))) |
| 4 | Add Round Key(Mix Colum(Shift Row(Byte Sub(State)))) |
| 5 | Add Round Key(Mix Colum(Shift Row(Byte Sub(State)))) |
| 6 | Add Round Key(Mix Colum(Shift Row(Byte Sub(State)))) |
| 7 | Add Round Key(Mix Colum(Shift Row(Byte Sub(State)))) |
| 8 | Add Round Key(Mix Colum(Shift Row(Byte Sub(State)))) |
| 9 | Add Round Key(Shift Row(Byte Sub(State))) |

SUB BYTES TRANSFORMATION. The SubBytes transformation updates each byte in the state array with a corresponding byte in the Substitution Box (SBOX). The SBOX is the result of performing the multiplicative inverse followed by the affine transform of an element in the state array. The details of this process are often obscured and a Look Up table is often used, since each 8-bit element will map to the same value after performing these two operations, as shown FIG. 5.

Unless this table is replicated 16 times, the SubBytes step of the round can take 16 clock cycles. Normally, this is undesirable, so multiple copies of this table may be made so that the look-up can occur within one clock cycle. Normally this will have an impact on the area usage with the severity varying depending on the type of platform used. Therefore, it is important to understand the process used to generate the SBOX, so that the decision of whether or not to use a look up table can be made.

Figure 6:
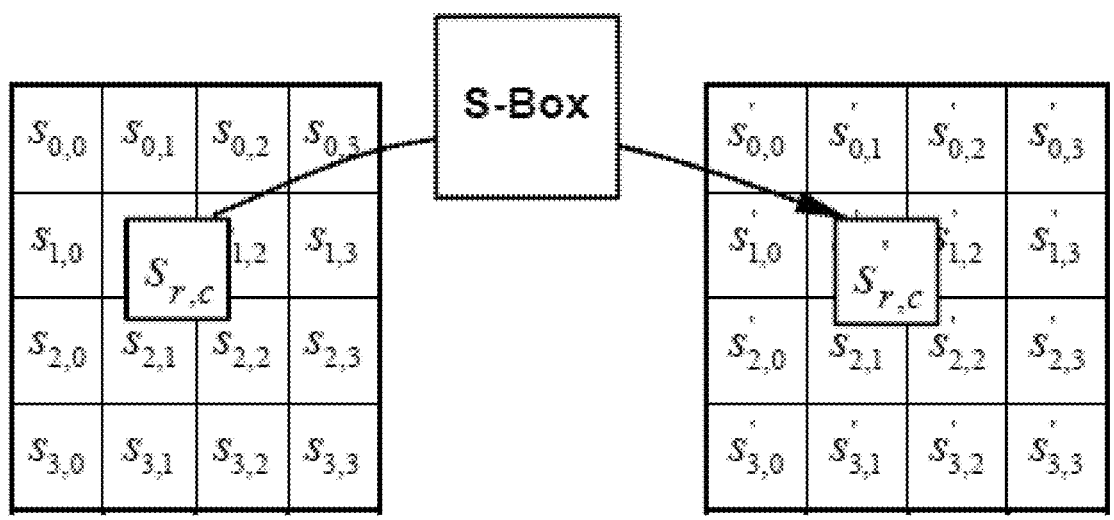
FIG. 6 is an exemplary illustration of the operation of the S-Box.

The S-Box is constructed by the composition of two transformations—first multiplicative inverse is performed on the state matrix and then an affine transformation is applied to the result. Since the S-Box is independent of any input, pre-calculated forms are used if enough memory (256 bytes for 1 S-Box) is available. Each byte of the state is then substituted by the value in the S-Box corresponding to the index value of the state. FIG. 6 shows the operation of the S-Box.

SHIFT ROW TRANSFORMATION. The data in this algorithm are grouped in bytes, and are represented in column-major matrix format, i.e. the first four bytes forms the first column rather being aligned in a typical row representation as shown in FIG. 2. Data includes cipher, key and all other intermediate values. Even though all data is column-major aligned, every layer operates on row-major fashion, i.e. on each row individually.

Figure 7:
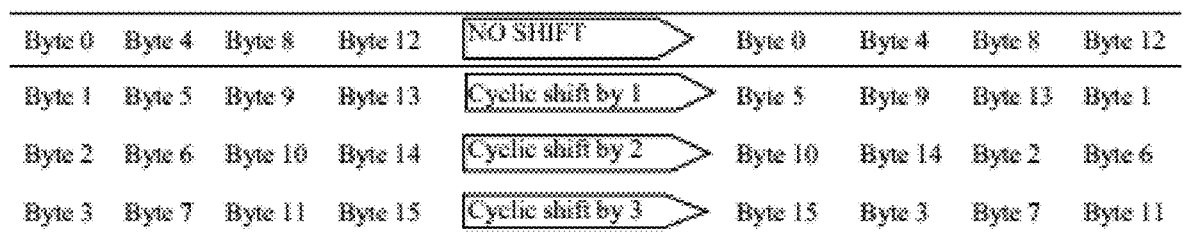
FIG. 7 is an exemplary illustration of the byte order of the block after the shift rows transformation.

During encryption, cyclic left rotation is performed by a certain number of bytes. Row (0) is left alone, Row (1) is shifted to the left one byte; the reason being 4 cyclic shifts would yield the same product as the original word, Row (2) is shifted to the left two bytes and Row (3) is shifted to the left three bytes. After the shift rows transformation, the byte order of the block is scrambled and shown in FIG. 7.

MIX COLUMNS TRANSFORMATION. In the MixColumns transformation, the state array is multiplied by a circulant Maximum Distance Separable (MDS) matrix. The columns of the circulant matrix are shifted to the right circularly. The first column is left alone, the second is shifted by one byte, the third column is shifted by two bytes and the fourth column is shifted by three bytes. The circulant matrix used in the AES algorithm is defined by the polynomial $c(x)=3x^3+x^2+x+2$ where 2 represents $c_0$, 1 represents $c_1$ and $c_2$, and 3 represents $c_3$, as shown in FIG. 8. Each column of the state array is then multiplied by this entire circulant matrix to produce each column of the new state array after the transformation. The correct matrix multiplication is then performed as shown in FIG. 9.

The multiplication is performed one column at a time (4 bytes). Therefore, each value of the column is multiplied against every value of the matrix which is totally 16 multiplications per column. The products of the multiplications are then XORed to produce only 4 bytes again for the next state operation. Thus, for 4 bytes of input, 16 multiplications and 12 XORs are done. Table 4 shows the expansion of the multiplication and XOR of each column.

TABLE 4

Expanded example of mix column transformation $b_0 = (02 * a_0) \otimes (03 * a_1) \otimes a_2 \otimes a_3;$
$b_1 = (02 * a_1) \otimes (03 * a_2) \otimes a_3 \otimes a_0;$
$b_2 = (02 * a_2) \otimes (03 * a_3) \otimes a_0 \otimes a_1;$
$b_3 = (02 * a_3) \otimes (03 * a_0) \otimes a_1 \otimes a_2;$
$b_4 = (03 * a_0) \otimes a_1 \otimes a_2 \otimes (02 * a_3);$
$b_5 = (03 * a_1) \otimes a_2 \otimes a_3 \otimes (02 * a_0);$
$b_6 = (03 * a_2) \otimes a_3 \otimes a_0 \otimes (02 * a_1);$
$b_7 = (03 * a_3) \otimes a_0 \otimes a_1 \otimes (02 * a_2);$
$b_8 = a_0 \otimes a_1 \otimes (02 * a_2) \otimes (03 * a_3);$
$b_9 = a_1 \otimes a_2 \otimes (02 * a_3) \otimes (03 * a_0);$
$b_{10} = a_2 \otimes a_3 \otimes (02 * a_0) \otimes (03 * a_1);$
$b_{11} = a_3 \otimes a_0 \otimes (02 * a_1) \otimes (03 * a_2);$
$b_{12} = a_0 \otimes (02 * a_1) \otimes (03 * a_2) \otimes a_3;$
$b_{13} = a_1 \otimes (02 * a_2) \otimes (03 * a_3) \otimes a_0;$
$b_{14} = a_2 \otimes (02 * a_3) \otimes (03 * a_0) \otimes a_1;$
$b_{15} = a_3 \otimes (02 * a_0) \otimes (03 * a_1) \otimes a_2;$ The purpose of the MixColumns step along with the ShiftRows step is to provide diffusion in the Rijndael cipher. Diffusion in cryptography means the output bits depend on the input bits, but in a complex way. If one input bit is changed, the output bits should change completely, in an unpredictable manner.

ADD ROUND KEY TRANSFORMATION. The AES algorithm has key/data block length of product of 32-bits. A minimum of 6 round transformation for AES process is proposed to be resistive to all cryptanalysis attacks, as a security margin, 4 more rounds are added for up to 128-bits. For every addition of 32-bits to the block length another round is added to the process. In this step of the encryption process, the state array is XORed with a round key generated from the key expansion process. Each word of the state array and round key matrices are XORed together to create a word in the resultant matrix. This is repeated for all the elements of the matrices. FIG. 10 shows the round key addition step.

DECRYPTION. The cipher text of 128 bits and the same key of 128 bits will be given as the input to the decryption block. The encrypted data will be decrypted and the original plain message will be achieved as the output of the decryption block. The Cipher transformations can be inverted and then implemented in reverse order to produce a straightforward Inverse Cipher for the AES algorithm. The individual transformations used in the Inverse Cipher are listed as follows:

InvShiftRows
InvSubBytes
InvMixColumns
AddRoundKey

Figure 11:
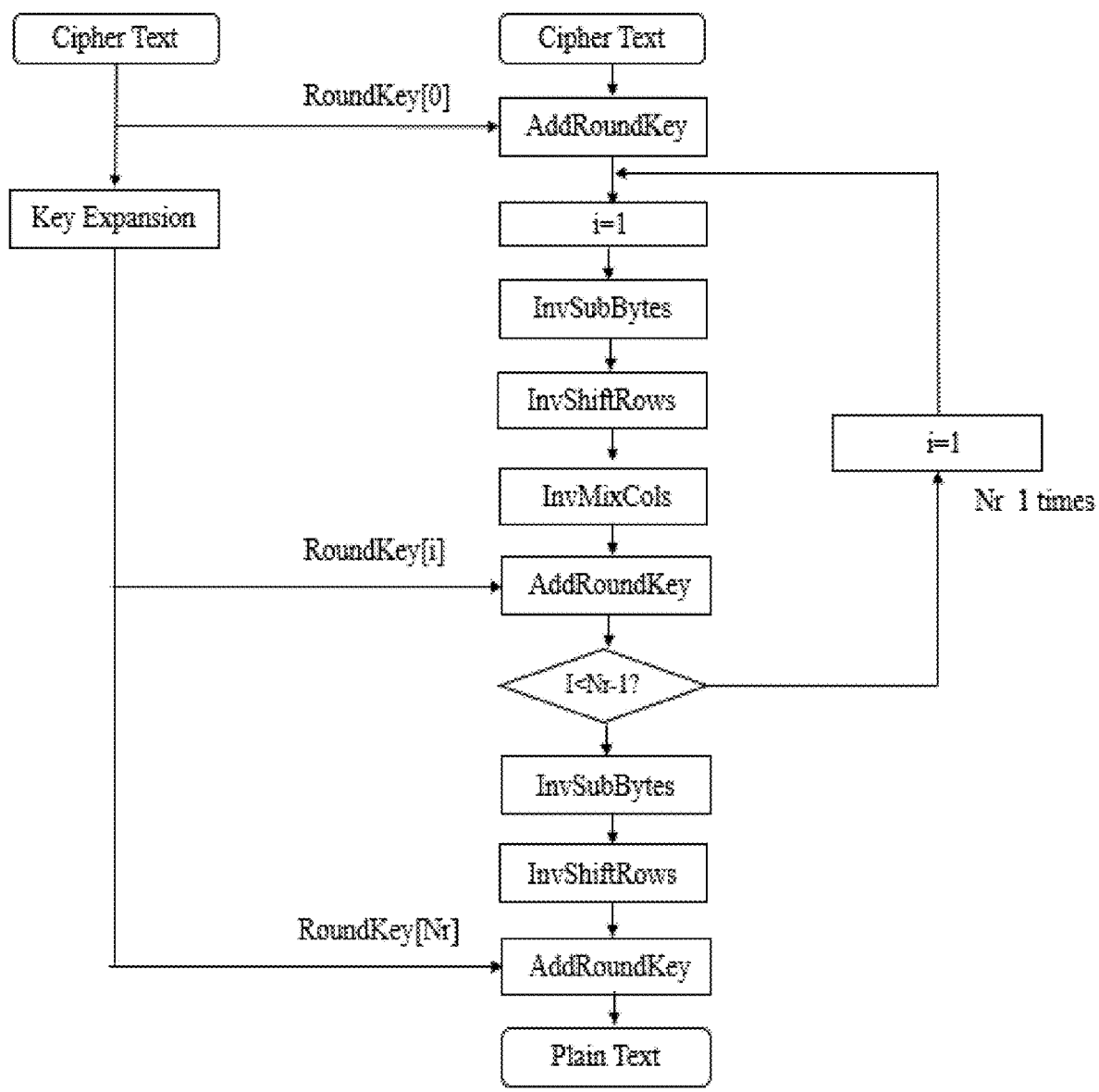
FIG. 11 is an exemplary flow diagram of the steps involved in the AES decryption process.

FIG. 11 shows a flow diagram of the steps involved in the decryption process. All the rounds are identical except the last one in which the mix columns transformation is eliminated. Thus, the original data or plaintext will be achieved at the end of the last round of the algorithm.

The decryption algorithm also uses the same transformations as in the encryption algorithm but in the inverse form. Therefore, the predefined values used in each transformation will be different. It is similar to the encryption process in the way that it performs four transformations for 9 iterations and omits the inverse mix column step in the last round. The Add Round Key transformation is performed the same way as in the encryption algorithm. The cipher text is XORed with the immediate expanded key in that particular iteration. The resultant state matrix is then given as input to the Inverse Shift Rows transformation. The inverse transformations are explained below.

Figures 12, 13:
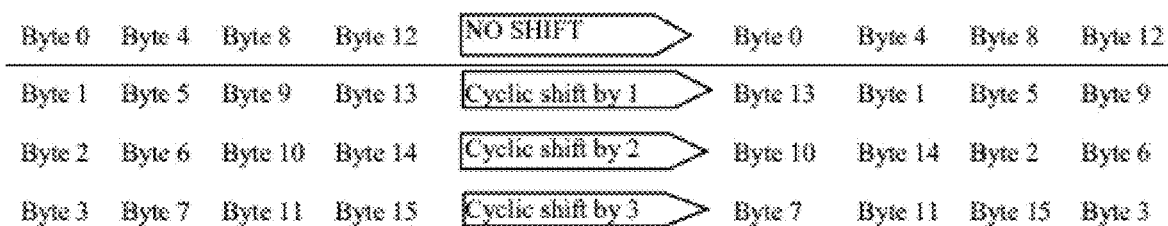
FIG. 12 is an exemplary illustration of the inverse shift rows operation in the AES process.
FIG. 13 is an exemplary illustration of the Inverse S-Box used in the AES process.

INVERSE SHIFT ROWS. This transformation is very similar to the shift rows transformation performed while the encryption process takes place. The only difference is that the bytes are cyclic shifted to the right instead of left. Therefore Row(0) is left alone, Row(1) is shifted to the right by one byte, Row(2) is shifted to the right by two bytes and Row(3) is shifted to the right by three bytes. This is illustrated in FIG. 12.

INVERSE SUB BYTES. InvSubBytes is the inverse of the SubByte transformation. In which the inverse S-Box is applied to each byte of the current state. The transformation will be carried out in the same way as for encryption meaning that the substitution value will be determined by the intersection of the row and the column in the Inverse S-Box.

This process works by generating the Inv S-box, done in the opposite manner, where first, the inverse affine transform of the input value is taken. Then the multiplicative inverse of the result is done either using the Extended Euclidean Algorithm or the composite field arithmetic. This results in the Inverse S-Box as shown in FIG. 13.

Figure 14:
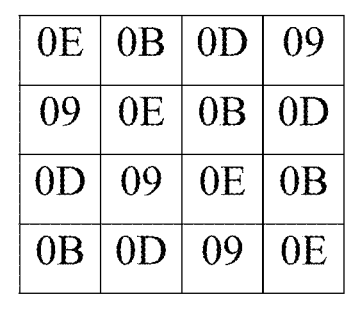

INVERSE MIX COLUMN. For decryption, the InvMixColumns step is performed using the Inverse Circulant Matrix shown in FIG. 14. The multiplication is done column wise just like it is done for encryption.

The multiplication of each element by 0x9 0xB 0xD and 0xE are simplified when broken up into an XOR combination of simpler multiplications. InvMixColumns step is not performed in the final round of the decryption process.

Embodiments of the present systems and methods involve mainly the ShiftRow layer of the AES process and may achieve lower power consumption compared to the original ShiftRow transformation. The shift row operation in the original process takes place by performing cyclic left rotation on each row of the state array by a certain number of bytes during encryption and cyclic right shift by the same number of bytes during decryption. The first row is shifted by 0 bytes, the second row by 1 byte, the third row by 2 bytes and the final row by 3 bytes. This cyclic shift is typically achieved by using shift registers.

Embodiments of the present systems and methods may utilize a novel technique to perform the shift row operation. Embodiments may use multiplexer logic to perform this transformation as opposed to performing a cyclic shift using registers thereby aiming to reduce area and power considerably. The multiplexer based shift row operation may be achieved by tying the elements of the shifted state matrix to multiplexers in the same order in which they must be arranged in the state matrix after the shift.

Figure 15:
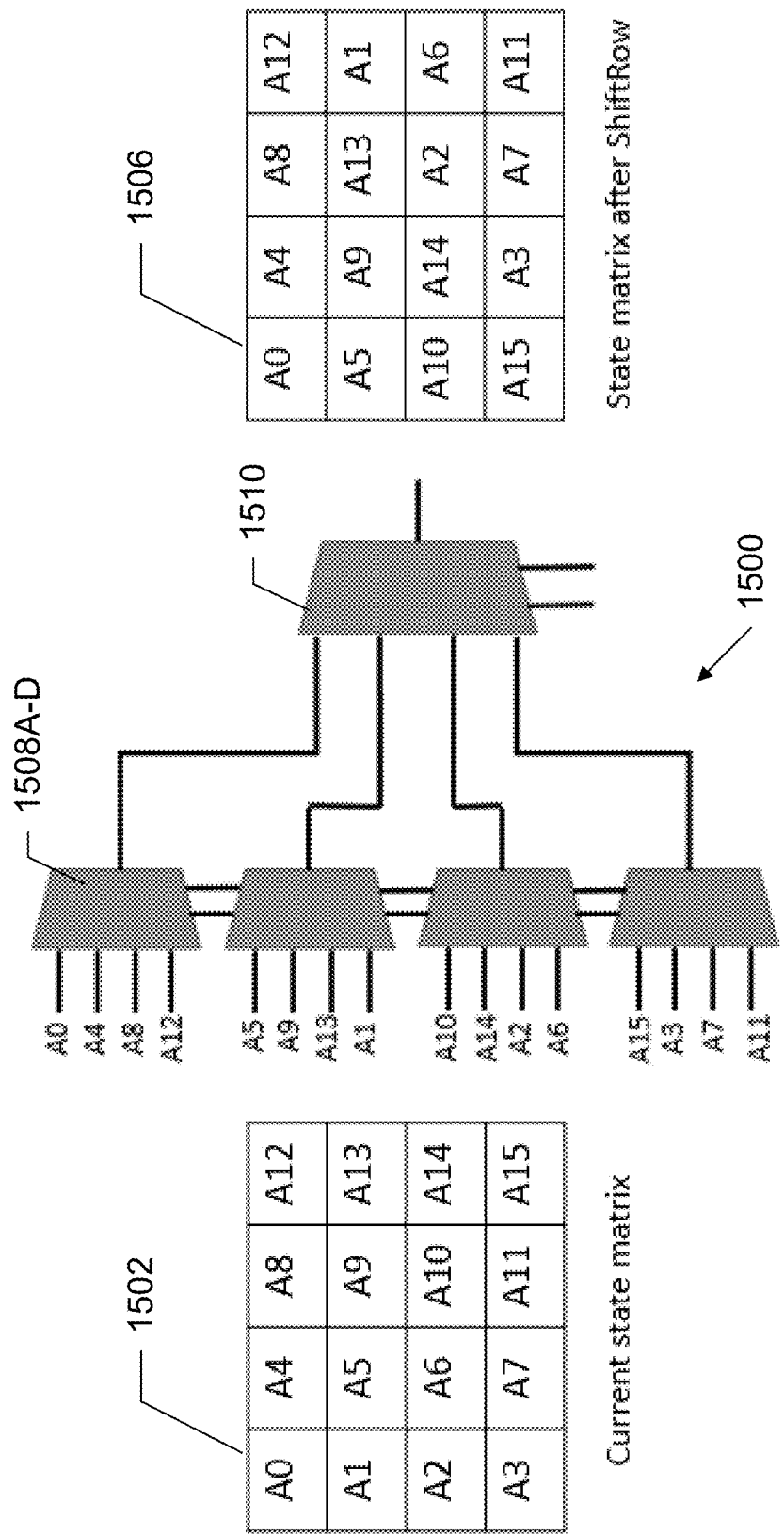
FIG. 15 is an exemplary illustration of an exemplary embodiment of circuitry to implement the present process with a current state matrix, according to embodiments of the present systems and methods.
Figure 16:
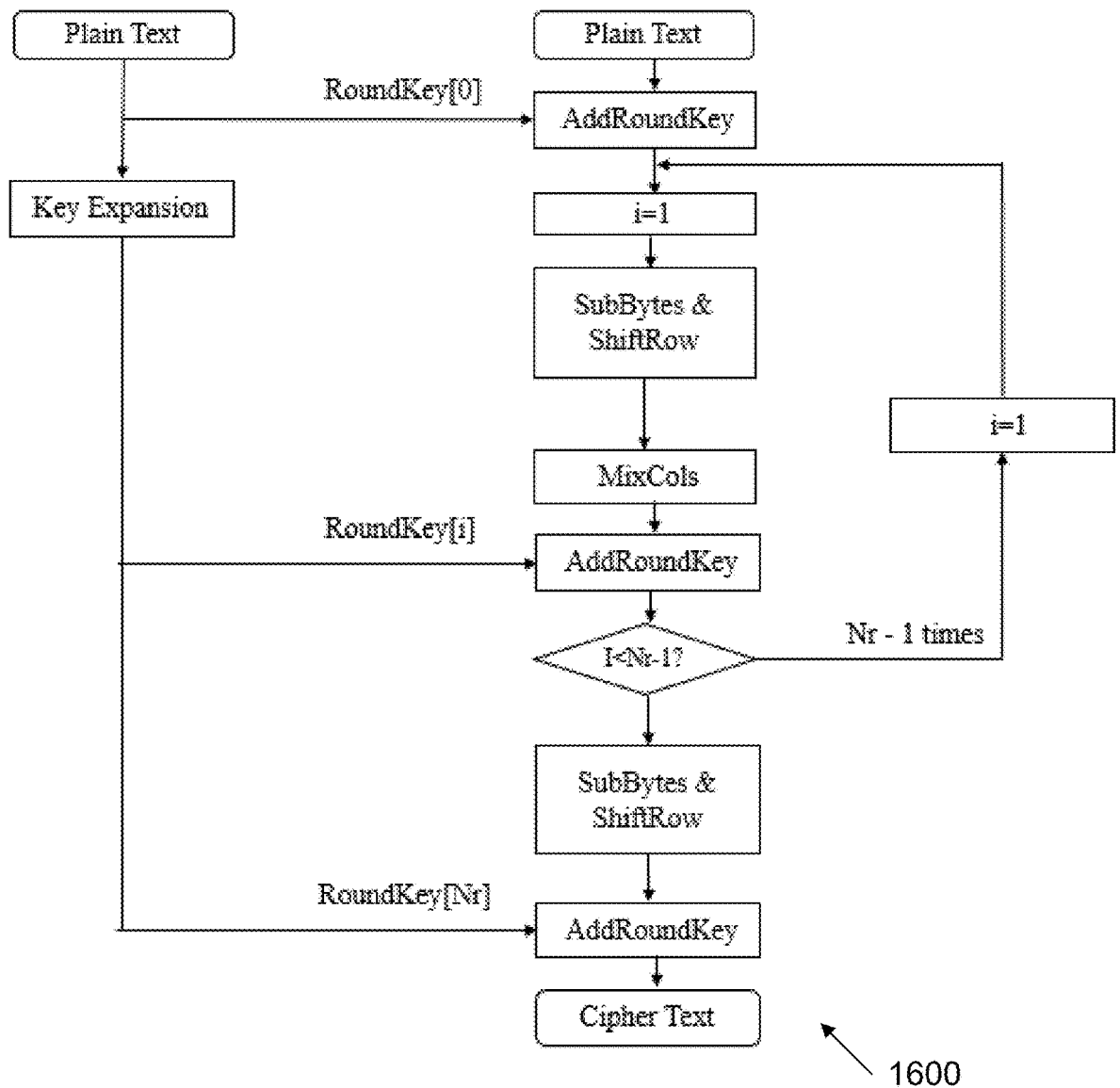
FIG. 16 is an exemplary flow diagram of the modified AES encryption process, according to embodiments of the present systems and methods.
Figure 17:
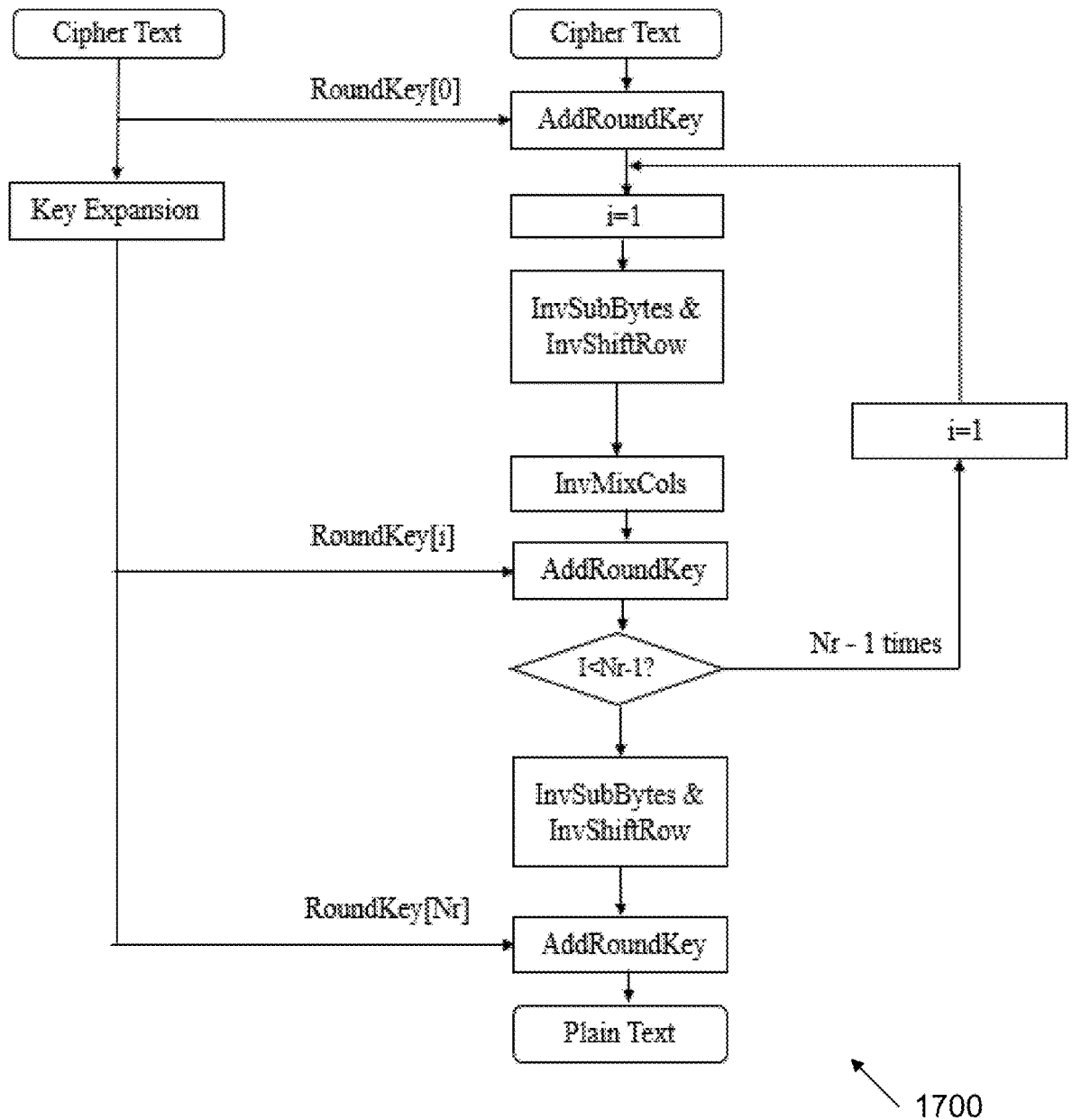
FIG. 17 is an exemplary flow diagram of the modified AES decryption process, according to embodiments of the present systems and methods.

FIG. 15 illustrates an exemplary embodiment of circuitry to implement the present process with a current state matrix (after SubByte transformation) 1502, multiplexers 1500, and the state matrix with the shifted elements after ShiftRow 1506. In the ShiftRow operation, each row is shifted by a certain number of bytes, which means a total of 128 bits are shifted in each round. Conventional approaches use 128 1-bit shift registers or an equal number of higher bit registers, which would mean extra area and power consumption in each of the 10 rounds of encryption as well as decryption. Embodiments of the present systems and methods may eliminate this unnecessary circuitry by using multiplexers to perform the shifting by tying the shifted order of bytes to the multiplexer inputs. Thus, one entire step of the process may be eliminated from each round. Both SubByte and ShiftRow operations may be completed in one step. Implementation of the modified process may reduce power consumption considerably. An exemplary flow diagram of the modified AES encryption process 1600 is shown in FIG. 16. An exemplary flow diagram of the modified AES decryption process 1700 is shown in FIG. 17.

As may be observed from processes 1600 and 1700, merging the two steps of SubByte and ShiftRow reduces the algorithm to three steps instead of four during encryption. Similarly, the InvSubBytes and InvShiftRow may be merged during decryption. Since one whole step is removed from the algorithm in the encryption as well as decryption processes, the total hardware used is reduced consequently reducing area and power consumption.

To further reduce the power consumption of embodiments of the present systems and methods, clock gating may be performed on both designs, that is, the conventional ShiftRow design and the multiplexer-based ShiftRow design of embodiments of the present systems and methods.

Methodology. Examples of design methodologies for embodiments of the present systems and methods may include entry of HDL code for the modified AES design compiled and implemented using XILINX ISE®. The simulation may be done, for example, using MODEL SIM® by MENTOR GRAPHICS® and functional verification may be done using the waveform viewer in the software. The compiled HDL code may then be synthesized into a gate level HDL netlist using, for example, SYNOPSYS DESIGN VISION® compiler. This is also used to generate a timing and area report using the GSCL 45 nm technology file library of Synopsys. In this example, the design is made to operate at a frequency of 100 MHz. Here the netlist is simulated and its activity is recorded and saved to a file. This activity file is then used to make a power estimation of the design using Synopsys Primetime. These power and timing reports are read and checked to compare the parameters of each design.

The modified process may be compared with the conventional process which uses cyclic shift for the ShiftRow transformation. The design may be compiled as a fully sequential design using the logic for Affine Transforms in the SubBytes stage as compared to defining the stage using a Look Up Table (LUT). As shown in FIG. 15, overall five 4×1 multiplexers 1500 may be used to implement the process. The substituted inputs from current state matrix 1502 may be tied to the input pins of four multiplexers 1508A-D in the shifted order of the substituted state matrix. The fifth multiplexer 1510 may be used to select one output out of each of the produced outputs in the four multiplexers.

This design may be compared to conventional AES designs that follow the conventional shift operation. Clock gating may be performed on both designs. Multiplexer shift may be implemented with a completely sequential design and clock gating is performed on this design as well. Such comparative analysis may be done in terms of average power and delay for each design.

Figure 18:
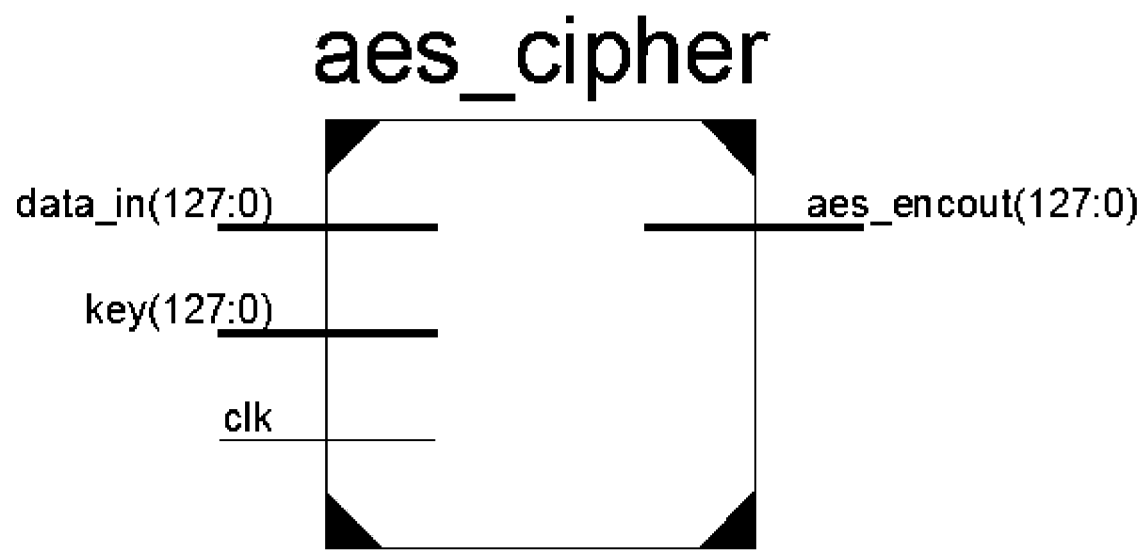
FIG. 18 is an exemplary RTL schematic of the top module, according to embodiments of the present systems and methods.
Figure 19:
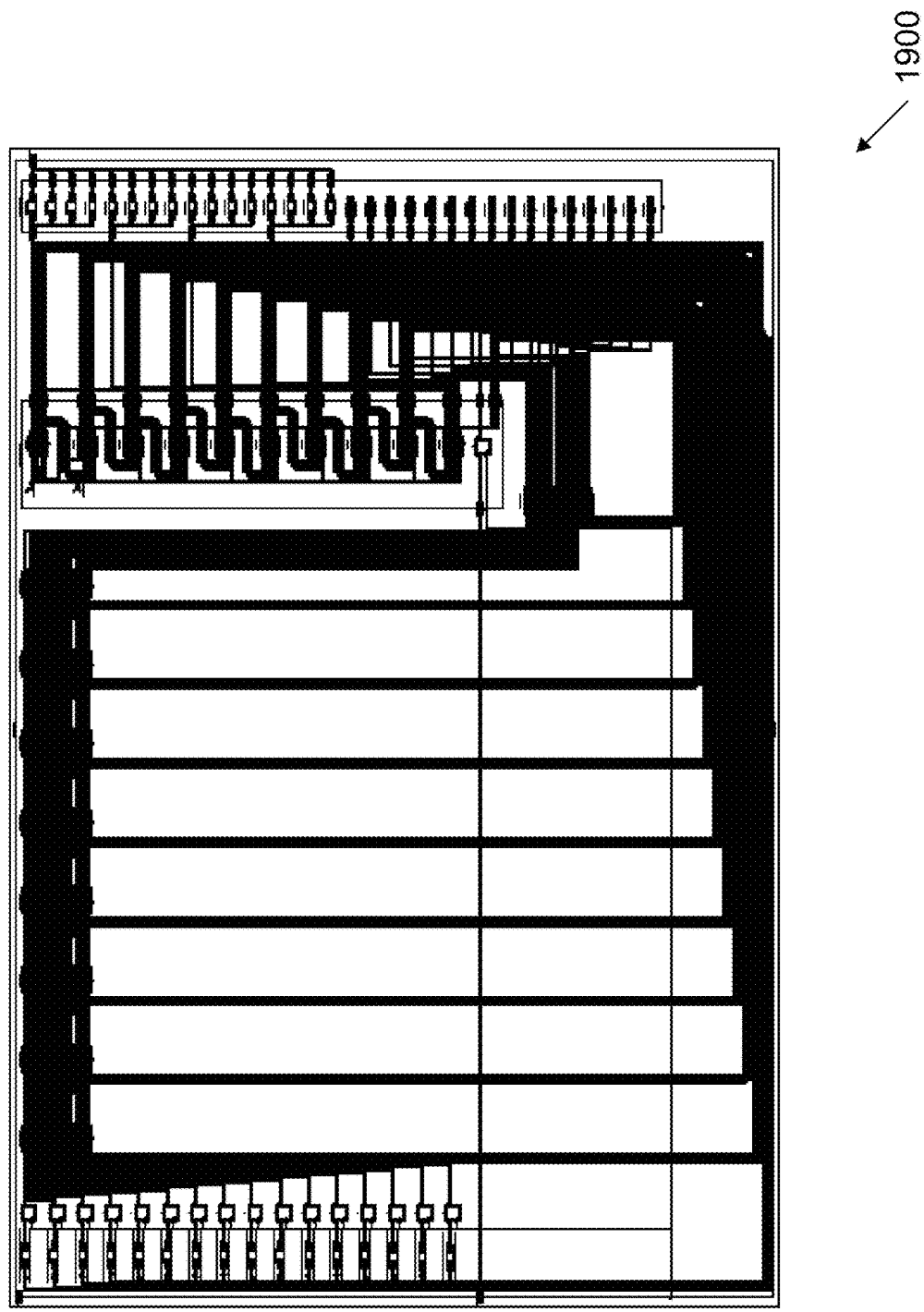
FIG. 19 is an exemplary top level schematic, according to embodiments of the present systems and methods.
Figure 20:
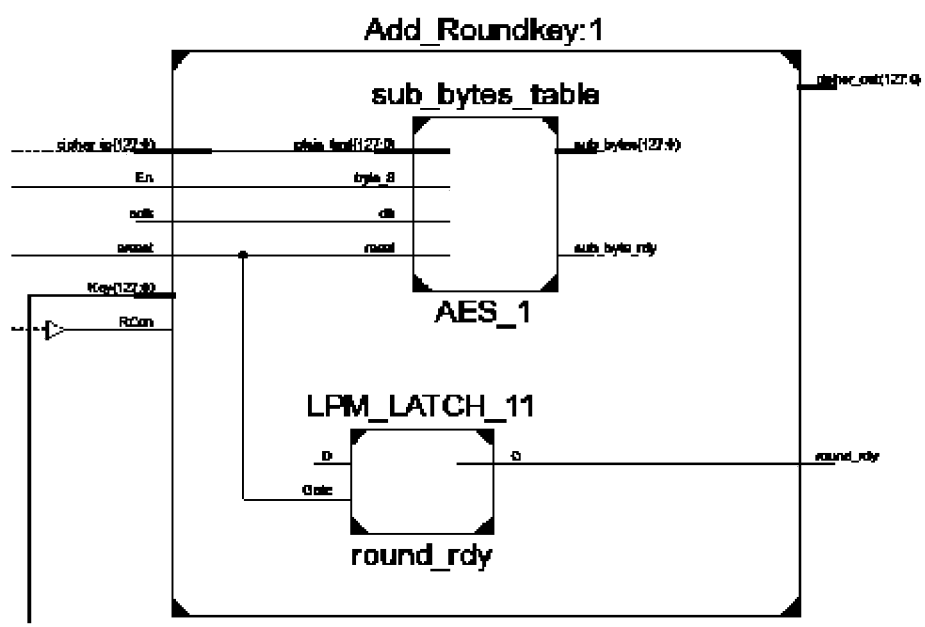
FIG. 20 is an exemplary RTL Schematic of an AddRound-Key Module, according to embodiments of the present systems and methods.
Figure 21:
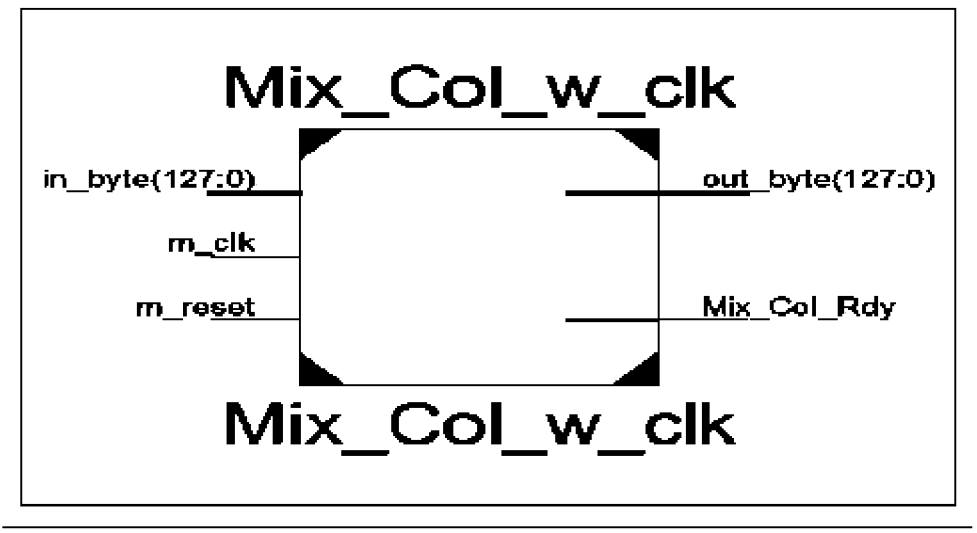
FIG. 21 is an exemplary RTL schematic of a MixColumns Module, according to embodiments of the present systems and methods.

Embodiments of the 128-bit AES encryption algorithm were successfully implemented and functional verification performed for the designs described above. Examples of the synthesis, schematic, and simulation results are provided. An exemplary breakdown illustration of the sub-modules is also provided. Exemplary RTL schematics of the top module and each sub-module are shown in the drawings. For example, FIG. 18 shows an exemplary RTL schematic of the top module 1800. FIG. 19 shows an exemplary top level schematic 1900 showing the instances of 10 rounds of encryption. FIG. 20 shows an exemplary RTL Schematic of an AddRoundKey Module 2000. FIG. 21 shows an exemplary RTL schematic of a MixColumns Module 2100.

Figure 22:
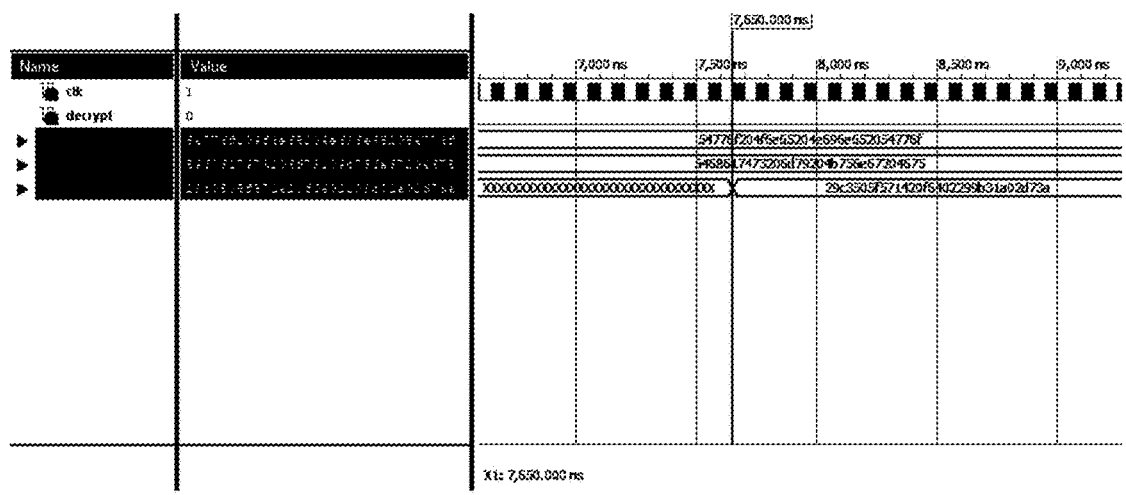
FIG. 22 shows exemplary simulation results showing encryption waveforms, according to embodiments of the present systems and methods.
Figure 23:
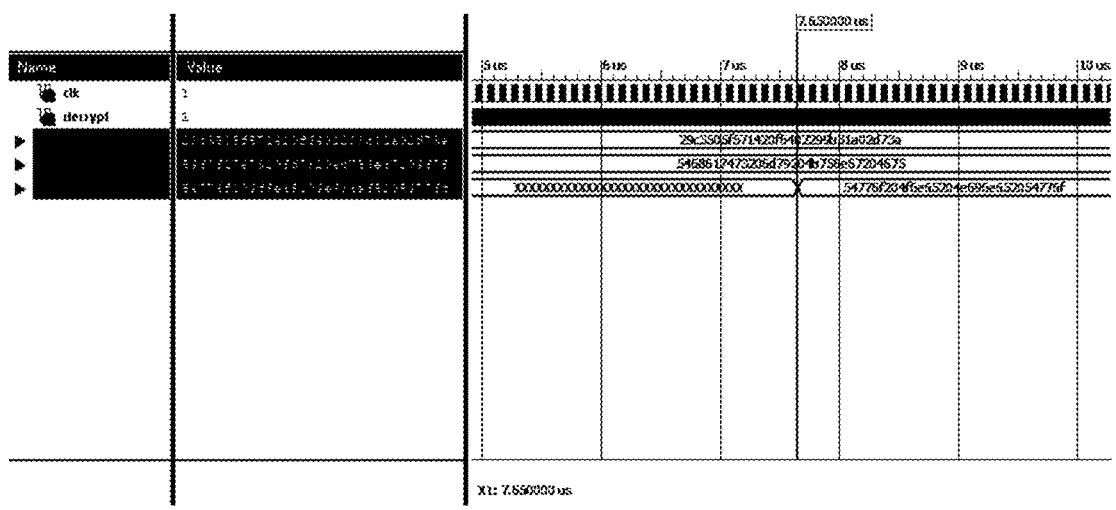
FIG. 23 shows exemplary simulation results showing decryption waveforms, according to embodiments of the present systems and methods.

Exemplary simulation results showing encryption and decryption waveforms illustrating the correct functionality of the designs are shown in FIGS. 22 and 23. FIG. 22 shows an exemplary simulation waveform 2200 of encryption, with
  Data Input=128'h54776F204F6E65204E696E652054776F,
  Key=128'h5468617473206D79204B756E67204675, and
  Encrypted Data Output=128'h29C3505F571420F6402299B31A02D73A.

FIG. 23 shows an exemplary simulation waveform 2300 of decryption, with
  Encrypted Data Input=128'h29C3505F571420F6402299B31A02D73A,
  Key=128'h5468617473206D79204B756E67204675, and
  Decrypted output/original input=128'h54776F204F6E65204E696E652054776F As seen in the simulation waveforms, the plain text is given as input to the encryption module with a 128-bit key. The encrypted output or cipher text is then given as input to the decryption module with the same key. The decryption algorithm decrypts the encrypted data and returns the output as the plain text.

POWER AND DELAY ESTIMATION RESULTS. Power and delay estimation for three exemplary designs are presented in this section. Each design has two estimations; one for the design with clock gating and the other for the design with no clock gating. A comparison is provided at the end summarizing the estimation results. For simplicity:

The original AES process (combinational) is called Design 1
  Embodiments with a multiplexer are referred to as Design 2 and
  Embodiments with a fully sequential design with multiplexer are called Design 3

DESIGN 1. The delay and power results for Design 1 with clock gating and without clock gating are provided in this section. Table 5 shows Power Estimation for Design 1.

TABLE 5

| Power Group | Value (mW) | Percentage of total (%) |
|---|---|---|
| Net Switching Power | 51.8 | 55.18 |
| Cell Internal Power | 40.6 | 43.31 |
| Cell Leakage Power | 1.41 | 1.51 |
| Total Power | 93.8 | 100 |

Table 6 shows Delay Estimation for Design 1:

TABLE 6

| Time Group | Value (ns) |
|---|---|
| Data Required Time | 99.38 |
| Data Arrival Time | −14.09 |
| Slack (MET) | 85.30 |

Table 7 shows Power estimation for Design 1 with clock gating

TABLE 7

| Power Group | Value (mW) | Percentage (%) |
|---|---|---|
| Net Switching Power | 7.98 | 24.04 |
| Cell Internal Power | 7.93 | 23.91 |
| Cell Leakage Power | 17.27 | 52.05 |
| Total Power | 33.18 | 100 |

DESIGN 2. The delay and power results for Design 2 with clock gating and without clock gating are provided in this section. Table 8 shows Power Estimation for Design 2

TABLE 8

| Power Group | Value (mW) | Percentage (%) |
|---|---|---|
| Net Switching Power | 43.4 | 54.53 |
| Cell Internal Power | 34.7 | 43.62 |
| Cell Leakage Power | 1.47 | 1.05 |
| Total Power | 79.6 | 100 |

Table 9 shows Delay Estimation for Design 2:

TABLE 9

| Time Group | Value (ns) |
|---|---|
| Data Required Time | 99.38 |
| Data Arrival Time | −14.04 |
| Slack (MET) | 85.35 |

Table 10 shows Power estimation for Design 2 with clock gating

TABLE 10

| Power Group | Value (mW) | Percentage (%) |
|---|---|---|
| Net Switching Power | 9.09 | 48.27 |
| Cell Internal Power | 7.76 | 41.19 |
| Cell Leakage Power | 1.98 | 10.53 |
| Total Power | 18.8 | 100 |

DESIGN 3. The delay and power results for Design 3 with clock gating and without clock gating are provided in this section. Table 11 shows Power Estimation for Design 3.

TABLE 11

| Power Group | Value (mW) | Percentage (%) |
|---|---|---|
| Net Switching Power | 2.66 | 13.07 |
| Cell Internal Power | 12.27 | 61.5 |
| Cell Leakage Power | 4.57 | 23.43 |
| Total Power | 19.5 | 100 |

Table 12 shows Delay Estimation for Design 3:

TABLE 12

| Time Group | Value (ns) |
|---|---|
| Data Required Time | 99.38 |
| Data Arrival Time | −2.82 |
| Slack (MET) | 97.08 |

Table 13 shows Power estimation for Design 3 with clock gating.

TABLE 13

| Power Group | Value (mW) | Percentage (%) |
|---|---|---|
| Net Switching Power | 2.84 | 24.91 |
| Cell Internal Power | 5.19 | 45.52 |
| Cell Leakage Power | 3.37 | 24.91 |
| Total Power | 11.4 | 100 |

COMPARISON OF RESULTS. A comparison of results for Design 1, Design 2, and Design 3 are presented with and without clock gating. All designs operate at a frequency of 100 MHz. The power estimation is given in milliwatts and the delay is given in nano seconds. In each row, the design along with its power and delay estimation are provided. A discussion of the results is also provided.

Figure 24:
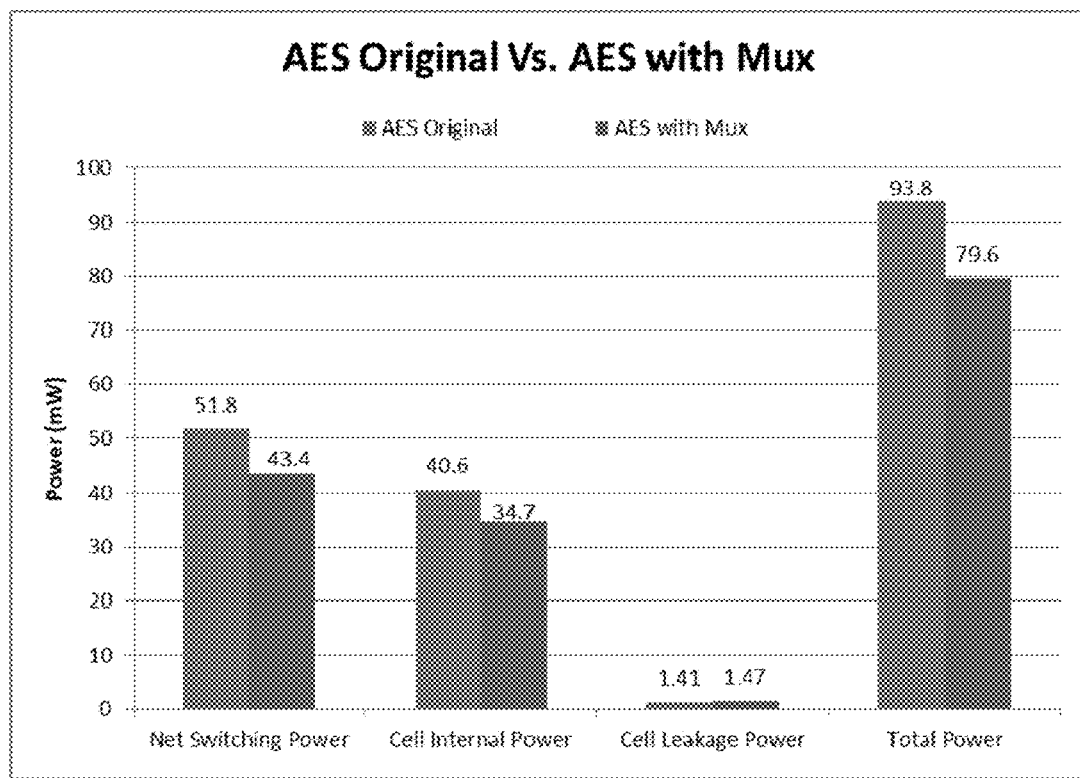
FIG. 24 shows exemplary simulation results showing power consumption comparisons, according to embodiments of the present systems and methods.
Figure 25:
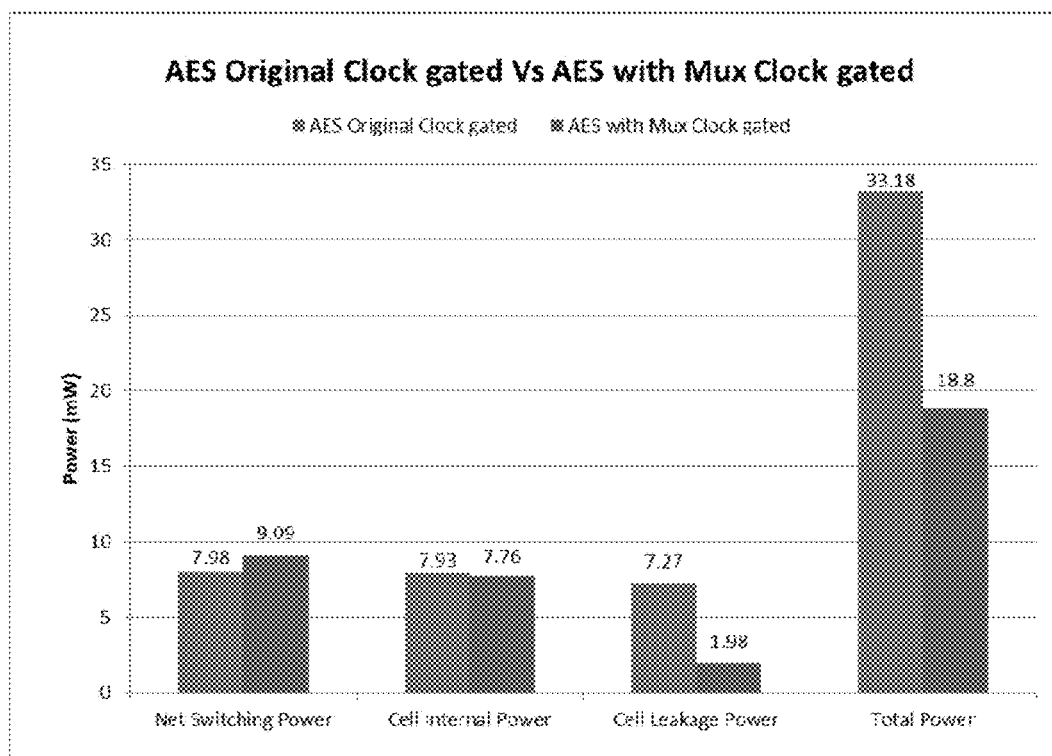
FIG. 25 shows exemplary simulation results showing power consumption comparisons, according to embodiments of the present systems and methods.
Figure 26:
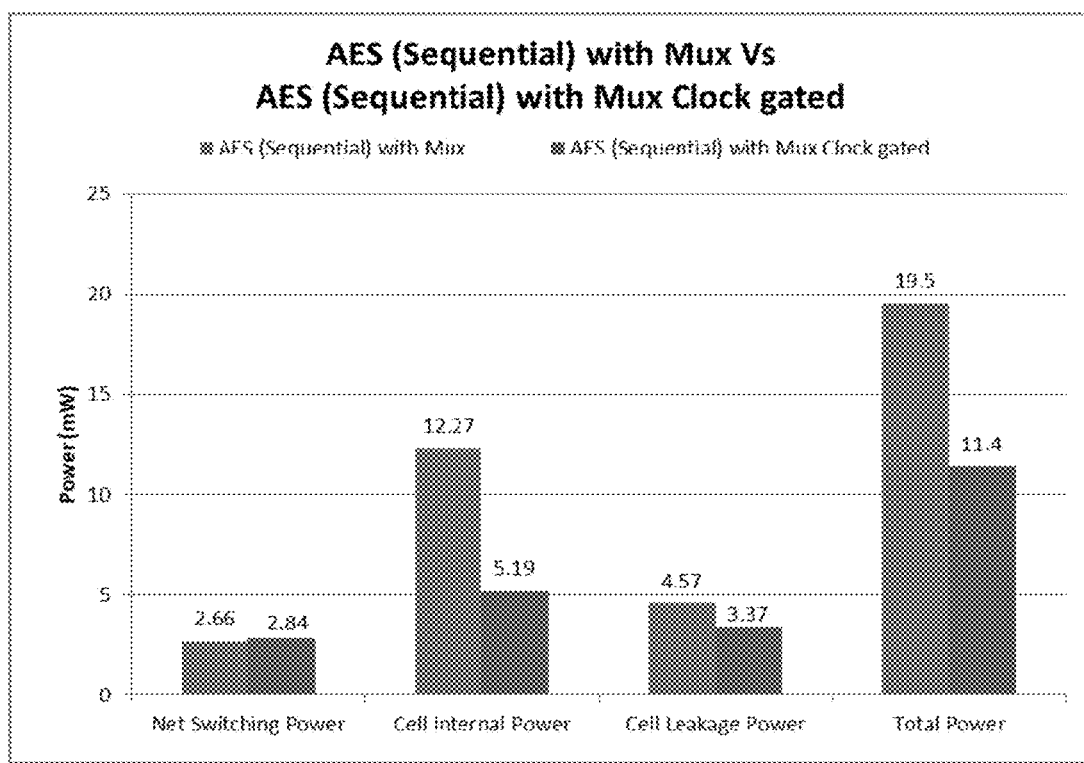
FIG. 26 shows exemplary simulation results showing power consumption comparisons, according to embodiments of the present systems and methods.

A comparison of power 2400 between Design 1 and Design 2 (without clock gating) is shown in FIG. 24. A comparison of power 2500 between Design 1 & Design 2 (with clock gating) is shown in FIG. 25. A comparison of power 2600 of Design 3 with and without Clock Gating is shown in FIG. 26. A comparison of power estimation for all designs is shown in Table 14.

TABLE 14

| Design | Non-clock gated | Clock Gated |
|---|---|---|
| Combinational original (Design 1) | 93.8 mW | 33.2 mW |

TABLE 14-continued

| Design | Non-clock gated | Clock Gated |
|---|---|---|
| Implementing multiplexer logic (Design 2) | 79.6 mW | 18.8 mW |
| Fully Sequential with multiplexer (Design 3) | 19.5 mW | 11.4 mW |

Figure 27:
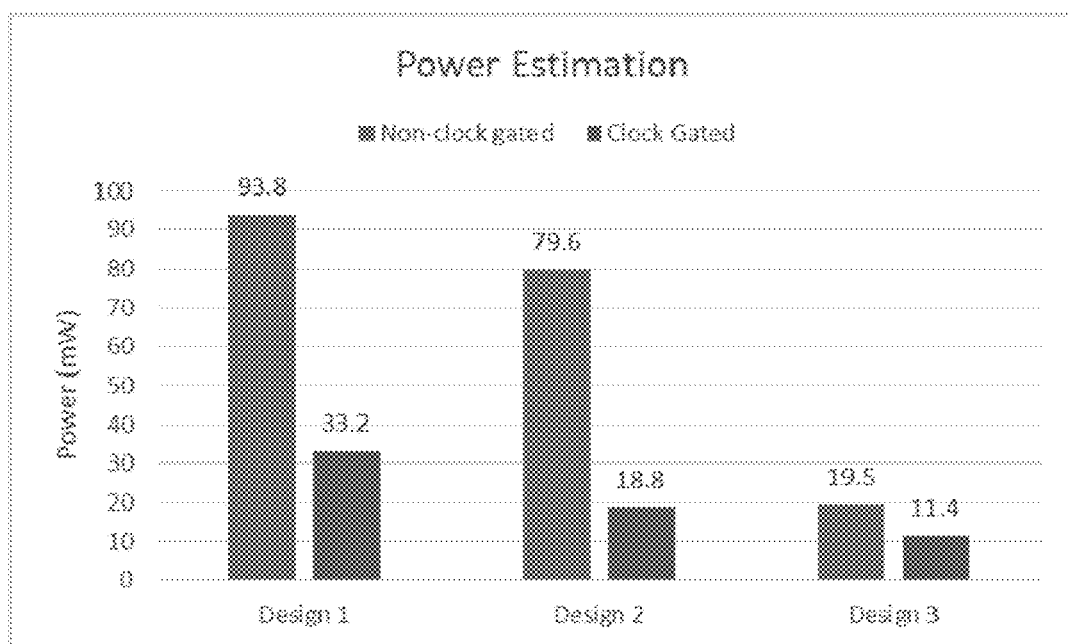
FIG. 27 shows exemplary simulation results showing power consumption comparisons, according to embodiments of the present systems and methods.

FIG. 27 shows power consumption of all the three designs with and without clock gating.

Security of data is of utmost importance in the internet era so as to not allow unintended recipients to view or access sensitive data. The internet technology is ever growing and future developments are only possible when this technology is established as a reliable and secure medium. This has brought forth the development of various methodologies to ensure the security of data such as encryption algorithms. Over the past few years, tremendous amount of work has been done on optimizing encryption algorithms at both the hardware and software level. One such algorithm that is widely used is the AES Algorithm. The AES Algorithm is an iterated symmetric block cipher, which means that it works by repeating the same defined steps multiple times and operates on a fixed number of bytes.

For many applications it is necessary for the design to consume lower power. The objective of this thesis is the design and implementation of low power 128 bit AES Algorithm. The five layers of the AES were analyzed extensively to identify algorithmic level changes for possible power optimization. This research introduced a new method for the shift row transformation step of the AES algorithm. The new method will reduce power consumption since it eliminates the usage of a large number of registers compared to the original transformation in the algorithm. This transformation takes place in every round of the encryption process as well as the decryption process thus the potential for power reduction is significant.

The proposed algorithm has been implemented and simulated using Xilinx ISE. It was synthesized and power and delay estimations were done using the Synopsys 45 nm technology library. Design 1, Design 2 and Design 3 were estimated to have a power consumption of 93.8 mW, 79.6 mW and 19.5 mW respectively, where Design 1 and Design 2 are the implementations of two existing algorithms and Design 3 is the implementation of the proposed algorithm.

It can thus be observed that the modified algorithm considerably reduces the power consumption as compared to the original algorithms. Furthermore, a fully sequential design of the AES algorithm with the modified Shift Row transformation consumes the least power among the designs under consideration. The delay results also show a consistent decrease. The delay values for Design 1, Design 2 and Design 3 are 14.09 ns, 14.04 ns and 2.82 ns respectively.

Clock gating was performed on each of these designs to further reduce the power consumption. It was observed that the application of clock gating decreased the overall power consumption of all the designs with minimal delay penalty. Since the main objective of the thesis is to optimize power consumption, it can safely be concluded that the proposed algorithm has proved to be a power efficient model. Furthermore, it may be concluded that clock gating the design would decrease power consumption even more with minimal delay penalty.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

From the above description, it can be seen that the present invention provides a system and method for the efficient execution of the described techniques. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. An apparatus comprising:
a processor;
memory storing a plaintext, an encryption key, a current state matrix, a resultant state matrix, and a ciphertext;
a first, a second, a third, and a fourth plurality of interconnections; and
a first, a second, a third, a fourth, and a fifth four-by-one multiplexers; wherein
the processor, the memory, the first, second, third, fourth, and fifth four-by-one multiplexers, and the first, second, third, and fourth plurality of interconnections perform an encryption and decryption process comprising using an iterated block cipher to convert the plaintext to the ciphertext using the encryption key by applying a byte substitution operation using a substitution table, a row shifting operation that shifts rows of a state array by different offsets, a column mixing operation that mixes column data of the state array, and a round key adding operation that adds a round key to the current state matrix of each round of a round function, wherein the byte substitution operation is performed in the same step as the row shifting operation by including a look-up table, wherein the plaintext is transformed into the current state matrix and the resultant state matrix as intermediate values during intermediate operations of the iterated block cipher, and wherein the row shifting operation comprises:

using the first plurality of interconnections to connect a first row of the current state matrix to the first four-by-one multiplexer in an order of first row elements, wherein an arrangement of the first plurality of interconnections preserves the order of first row elements of the current state matrix as an order of inputs into the first four-by-one multiplexer;

transmitting from the first four-by-one multiplexer to the fifth four-by-one multiplexer the first row elements of the resultant state matrix, in the order received by the first four-by-one multiplexer;

using the second plurality of interconnections to connect a second row of the current state matrix to the second four-by-one multiplexer, wherein an arrangement of the second plurality of interconnections shifts an order of second row elements of the current state matrix by one to the left for input into the second four-by-one multiplexer;

transmitting from the second four-by-one multiplexer to the fifth four-by-one multiplexer the second row elements of the resultant state matrix, in the order received by the second four-by-one multiplexer;

using the third plurality of interconnections to connect a third row of the current state matrix to the third four-by-one multiplexer, wherein an arrangement of the third plurality of interconnections shifts an order of third row elements of the current state matrix by two to the left for input into the third four-by-one multiplexer;

transmitting from the third four-by-one multiplexer to the fifth four-by-one multiplexer the third row elements of the resultant state matrix, in the order received by the third four-by-one multiplexer;

using the fourth plurality of interconnections to connect a fourth row of the current state matrix to the fourth four-by-one multiplexer, wherein an arrangement of the fourth plurality of interconnections shifts an order of fourth row elements of the current state matrix by three to the left for input into the fourth four-by-one multiplexer;

transmitting from the fourth four-by-one multiplexer to the fifth four-by-one multiplexer the fourth row elements of the resultant state matrix, in the order received by the fourth four-by-one multiplexer; and transmitting from the fifth four-by-one multiplexer to the resultant state matrix each element in a row-by-row fashion, in the order the elements were received by the fifth four-by-one multiplexer.

2. The apparatus of claim 1, further comprising circuitry configured to perform clock gating.

3. The apparatus of claim 1, wherein the encryption and decryption process comprises the Advanced Encryption Standard.

4. The apparatus of claim 1, wherein the encryption and decryption process is a 128-bit process.

5. The apparatus of claim 1, wherein the apparatus is a first apparatus that consumes less power than a second apparatus comprising shift registers used to perform the row shifting operation.

6. The apparatus of claim 1, wherein the encryption and decryption process comprises a 256-bit process.

7. The apparatus of claim 1, wherein the processor, the memory, the first, second, third, fourth, and fifth four-by-one multiplexers, and the first, second, third, and fourth plurality of interconnections further performs the steps of a deciphering operation comprising an inverse operation of the byte substitution operation, the row shifting operation, the column mixing operation, and the round key adding operation.

8. The apparatus of wherein the encryption key is identical to a decryption key used for the deciphering operation.

* * * * *